(12) United States Patent
Grigoryan et al.

(10) Patent No.: US 9,632,905 B2
(45) Date of Patent: Apr. 25, 2017

(54) DATA-AGNOSTIC ADJUSTMENT OF HARD THRESHOLDS BASED ON USER FEEDBACK

(71) Applicant: VMware, Inc., Palo Alto, CA (US)

(72) Inventors: Naira Movses Grigoryan, Yerevan (AM); Mazda A. Marvasti, Coto de Caza, CA (US); Arnak Poghosyan, Yerevan (AM); Ashot Nshan Harutyunyan, Yerevan (AM); Yanislav Yankov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 211 days.

(21) Appl. No.: 14/312,815

(22) Filed: Jun. 24, 2014

(65) Prior Publication Data

US 2015/0370682 A1  Dec. 24, 2015

(51) Int. Cl.
  *G06F 11/34* (2006.01)
  *G06F 11/07* (2006.01)

(52) U.S. Cl.
  CPC .......... *G06F 11/3452* (2013.01); *G06F 11/07* (2013.01); *G06F 11/3433* (2013.01); *G06F 11/3438* (2013.01); *G06F 11/3495* (2013.01); *G06F 2201/81* (2013.01); *G06F 2201/875* (2013.01)

(58) Field of Classification Search
  CPC ............. G06F 11/3438; G06F 11/3452; G06F 11/3495; G06F 11/3466
  See application file for complete search history.

(56) References Cited

U.S. PATENT DOCUMENTS

| | | | |
|---|---|---|---|
| 9,013,294 B1* | 4/2015 | Trundle | G08B 25/001 340/501 |
| 2001/0007140 A1* | 7/2001 | Landry | G06F 11/327 714/48 |
| 2012/0167083 A1* | 6/2012 | Suit | G06F 11/0712 718/1 |
| 2013/0036122 A1* | 2/2013 | Cohen | G06F 11/3409 707/741 |
| 2013/0211858 A1* | 8/2013 | Ohnemus | G06F 19/322 705/3 |
| 2014/0032656 A1* | 1/2014 | Hyman | G06Q 30/02 709/204 |
| 2014/0266714 A1* | 9/2014 | Becker Antley | G06Q 10/107 340/540 |
| 2014/0278448 A1* | 9/2014 | Sadeghi | G06Q 50/22 705/2 |
| 2015/0033086 A1* | 1/2015 | Sasturkar | G06F 11/3082 714/57 |
| 2015/0172096 A1* | 6/2015 | Sadovsky | H04L 41/0631 709/224 |

\* cited by examiner

Primary Examiner — Yolanda L Wilson

(57) ABSTRACT

This disclosure is directed to data-agnostic computational methods and systems for adjusting hard thresholds based on user feedback. Hard thresholds are used to monitor time-series data generated by a data-generating entity. The time-series data may be metric data that represents usage of the data-generating entity over time. The data is compared with a hard threshold associated with usage of the resource or process and when the data violates the threshold, an alert is typically generated and presented to a user. Methods and systems collect user feedback after a number of alerts to determine the quality and significance of the alerts. Based on the user feedback, methods and systems automatically adjust the hard thresholds to better represent how the user perceives the alerts.

21 Claims, 18 Drawing Sheets

1. How indicative of a problem was the alert? ⟵ 302
   - ○ perfectly (1)
   - ○ highly (0.75)        ⟵ 316
   - ◉ rather (0.5)
   - ○ somewhat (0.25)
   - ○ none (0)

304 — 314 —

2. How indicative was the alert in terms of? ⟵ 306
   a. Criticality:
      - ○ too low  ⟵ 308   (1)
      - ○ early (0.75)
      - ◉ OK (0.5)
      - ○ high (0.25)
      - ○ too high (0)
   b. Timeliness:
      - ◉ too early ⟵ 310 (1)
      - ○ early (0.75)
      - ○ OK (0.5)
      - ○ late (0.25)
      - ○ too late (0)
   c. Duration:
      - ○ too short ⟵ 312 (1)
      - ○ short (0.75)
      - ○ OK (0.5)
      - ◉ long (0.25)
      - ○ too long (0)

FIG. 3

DATA-AGNOSTIC ADJUSTMENT OF HARD THRESHOLDS BASED ON USER FEEDBACK

TECHNICAL FIELD

The present disclosure is directed to adjusting hard thresholds of time-series data based on user feedback.

BACKGROUND

In recent years, the number of enterprises relying on cloud computing to meet their computing needs has substantially increased. Many enterprises are able to cut costs by simply purchasing cloud computing services from hosting service providers that maintain cloud computing facilities. As a result, these enterprises eliminate a heavy investment in facilities, security, upgrades, and operating expenses. Cloud computing is typically carried out in computing facilities that house a vast array of networked physical machines ("PMs"), data-storage devices, and network routers. The facilities use virtualization to efficiently and cost effectively run computing processes on one or more connected PMs. With virtualization, one or more PMs are partitioned into multiple independent virtual machines ("VMs") that function independently and appear to users as actual PMs. VMs can be moved around and scaled up or down as needed without affecting the user's experience.

In order to maintain computing facility operations and execution of applications, many physical and virtual computational resources, such as processors, memory, and network connections, and other data-generating entities are monitored over time. Data-generating entities generate time-series data that is collected, analyzed, and presented for human understanding. An alert is typically generated when the data violates a hard threshold so that a user can identify anomalies. However, because hard thresholds are static while data-generating entities may change over time, the likelihood of generating a false positive alert (i.e., an alert that incorrectly indicates a problem) or a false negative alert (i.e., an alert not given when there is a problem) based on the hard thresholds increases.

SUMMARY

This disclosure is directed to data-agnostic computational methods and systems for adjusting hard thresholds based on user feedback. Hard thresholds are used to monitor time-series data generated by a data-generating entity. The data-generating entity can be a computational process, computer, sensor, virtual or physical machine running in a data center or other computational environment, or a computational resource, such as a processor, memory, or network connection. The time-series data may be metric data that represents usage of the data-generating entity over time. The time-series data is compared with a hard threshold and when the data violates the threshold, an alert is typically generated and presented to a user. Methods and systems collect user feedback after a number of alerts to determine the quality and significance of the alerts. Based on the user feedback, methods and systems automatically adjust the hard thresholds to better represent how the user perceives the alerts.

DESCRIPTION OF THE DRAWINGS

FIG. 3 shows an example of survey questions that may be presented to a user after an alert.

DETAILED DESCRIPTION

This disclosure presents data-agnostic computational systems and methods for adjusting hard thresholds used to monitor time-series data based on user feedback. It should be noted, at the onset, that the currently disclosed computational methods and systems are directed to real, tangible, physical systems and the methods carried out within physical systems, including client computers and server computers. Those familiar with modern science and technology well appreciate that, in modern computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of their execution, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

Figure 1:
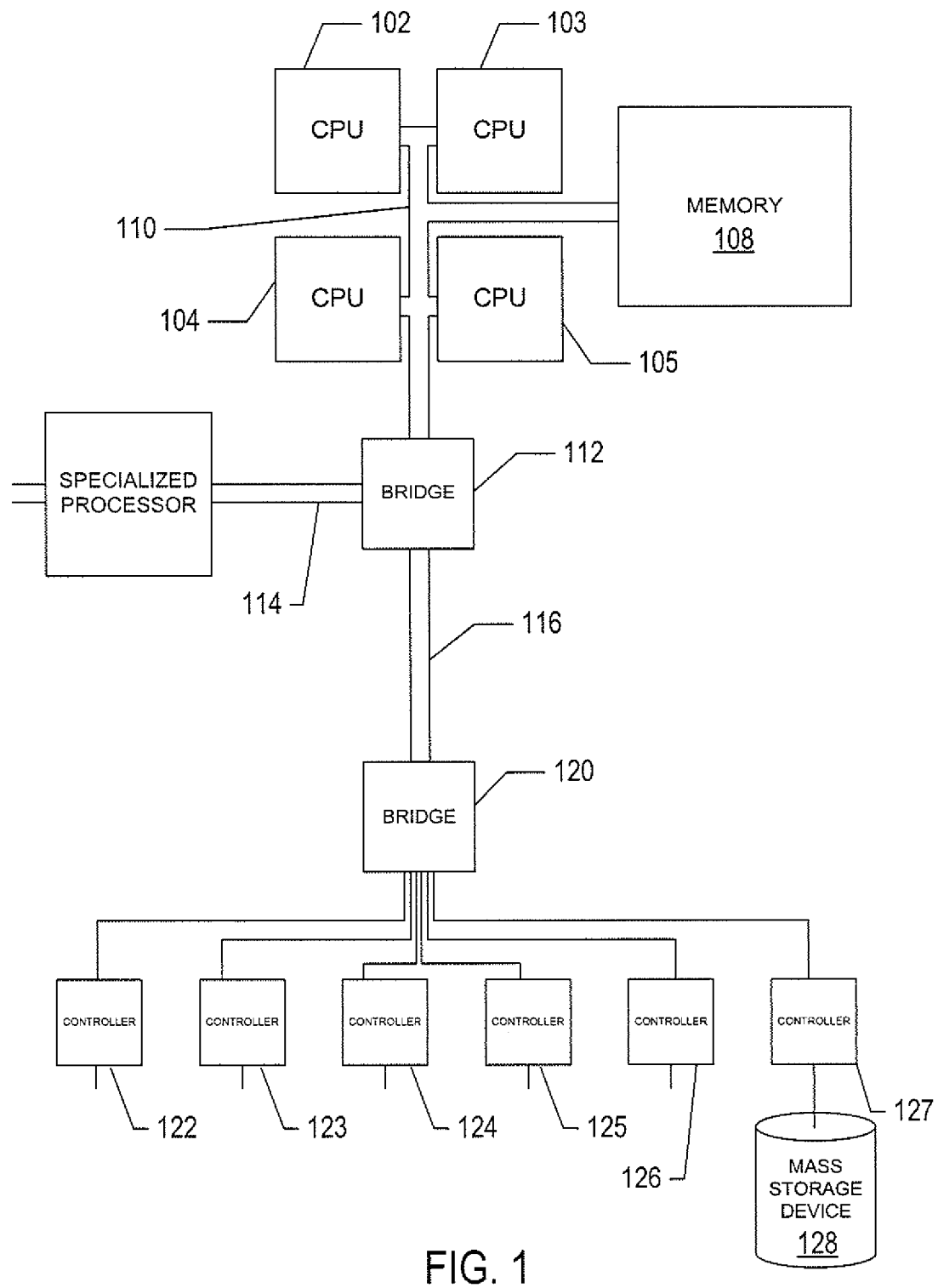
FIG. 1 provides a general architectural diagram for various types of computers.

FIG. 1 provides a general architectural diagram for various types of computers. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. The busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of computer-readable media, such as computer-readable medium 128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 128 is a data-storage device, including electronic memory, optical or magnetic disk drive, USB drive, flash memory and other such data-storage devices. The computer-readable medium 128 can be used to store machine-readable instructions that encode the computational methods described below and can be used to store encoded data, during store operations, and from which encoded data can be retrieved, during read operations, by computer systems, data-storage systems, and peripheral devices.

Thresholds and User Input

Figure 2:
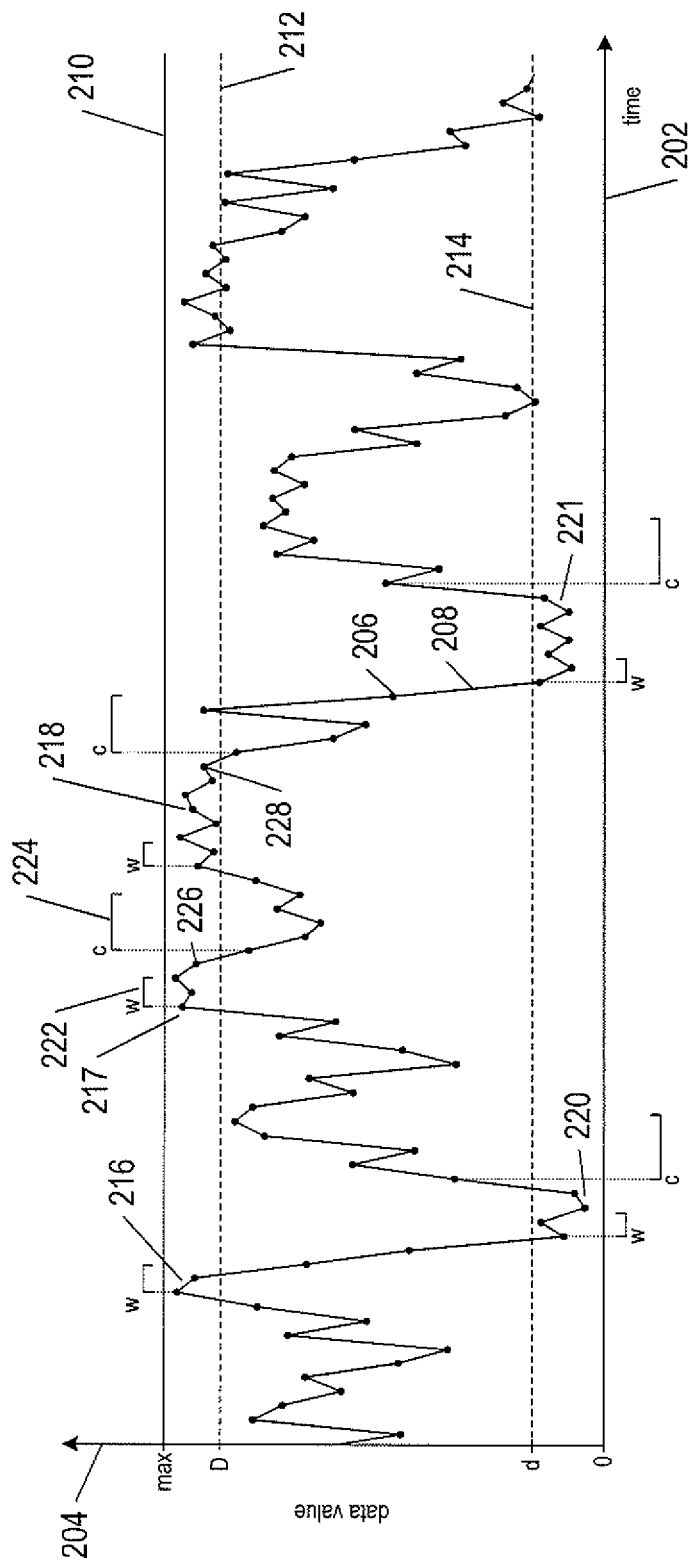
FIG. 2 shows a plot of time-series data generated for a physical or virtual computational resource.

FIG. 2 shows a plot of time-series data generated for a data-generating entity. The data-generating entity can be a computational process, computer, sensor, virtual or physical machine running in a data center or other computational environment, or a computational resource, such as a processor, memory, or network connection. The time-series data may be metric data that represents usage of the data-generating entity over time. Horizontal axis 202 represents time and vertical axis 204 represents data values. Dots, such as dot 206, are data values that represent usage of the resource measured at regularly intervals of time, and a curve 208 connecting the data values illustrates how the data values, or usage of the resource, changes over time. Horizontal line 210 represents maximum usage of the resource. For example, the time-series of data 208 can represent processor usage by a VM, memory usage by a VM, amount of electrical power consumed by a VM, or hard-disk space used by a VM and line 210 may represent 100% usage of the resource. The data can also represents usage of various physical resources of a data center, including buffer access, amount of memory in use, network connections used or idle, electrical power consumption, network throughput, availability of hard-disk space, and processor time.

In the example of FIG. 2, a user selects an upper hard threshold value, D, represented by dashed line 212 and a lower hard threshold, d, represented by dashed line 214. In particular, a user may only select an upper hard threshold, or a lower hard threshold, depending on the resource and the type of data. As shown in FIG. 2, the time-series of data 208 has three sets of consecutive data 216-218 with values greater than the hard threshold D and two sets of consecutive data 220 and 221 with values less than the hard threshold d. The user also selects a wait interval w that is used to generate an alert and a cancellation interval c that is used to timely cancel the alert. The length of the wait interval w is an integer that represents the minimum number of consecutive data points that violate the hard threshold before generating an alert. The length or duration of the cancellation interval c is an integer that represents the minimum number of consecutive data points returned to normal (i.e., no longer violate the threshold) after the last abnormality reported as an alert. The duration of the cancellation interval c determines when an active alert is canceled due based on recovery. For example, FIG. 2 shows example wait intervals that are three consecutive data points long, such as interval 222, and example cancellation intervals that are five consecutive data points long, such as interval 224. When a number of consecutive data points that violate a hard threshold is greater than or equal to the length w, an alert is generated, but the alert is cancelled and not reported to the user when the number of consecutive data points returned to normal is greater than the length c. On the other hand, when the number of consecutive data points returned to normal is less than the length c, the alert is not cancelled and presented to the user. For example, in FIG. 2, the set 216 has only two consecutive data points that violate the threshold D, which is not enough data points to generate an alert. The set 217 has four consecutive data points that violate the threshold D, which is enough data points to generate an alert, but the alert is cancelled because the number of consecutive data points returned to normal after the data point 226 is greater than the length c. On the other hand, the set 218 has eight consecutive data points that violate the threshold D, which is enough data points to generate an alert. But this alert is not cancelled because only three consecutive data points after the point 228 are below the threshold D which is less than the length c. In the case of the two sets 220 and 221, alerts are also generated because the number of consecutive data points in each set is greater than the length w, but the alerts are cancelled because the number of consecutive data points following the sets 220 and 221 is greater than the length c.

The user also selects an alert criticality level L to assign a level of importance to an alert. The criticality level L is a number in the interval [0,1]. When L=0 the alert is "non-critical" or "none," when the critical L=0.25 the alert is "informative;" when the criticality is L=0.5 the alert is a "warning;" when the criticality is L=0.75 the alert is "immediate;" and when criticality is L=1 the alert is "critical."

After an alert is displayed for a user, the user is presented with survey questions to determine how indicative the alert was of a problem with usage of the resource. Answers to the survey questions form user feedback that is used as input to adjust the hard threshold. However, adjustments to the hard threshold, as described below, are controlled by a user-defined noise tolerance N. The noise tolerance N is a numerical value in the interval [0,1] selected by a user to represent the user's tolerance to false positive alerts. A noise tolerance N equal to "0" indicates the user has no tolerance for false positive alerts while a noise tolerance N equal to "1" indicates the user is indifferent to false positive alerts. For example, a user may select the noise tolerance N equal to 0.2, which indicates the user has a low tolerance to false positive alerts.

Collecting Feedback Statistics

FIG. 3 shows an example of survey questions that may be presented to a user after an alert has been generated. In the example of FIG. 3, the user is presented with a general survey question regarding "How indicative of a problem was the alert?" 302. The user may then select one of five answers 304 that indicate the user's level of satisfaction with the alert. The survey also includes three additional more specific questions regarding "How indicative was the alert in terms of?" 306 "Criticality" 308, "Timeliness" 310, and "Duration" 312. For each of the example questions, the user selects one of five answers that indicate the user's level of satisfaction with the indicativeness, criticality, timeliness, and duration of the alert. The five answers the user may select from to answer each question are associated with numerical values in parentheses that lie in the interval [0,1]. These numerical values form the feedback statistics. For example, with regard to question 1, the user has filled in the bubble 314 which indicates that the user found the alert "rather" indicative of a problem which, in turn, corresponds to a feedback statistic of 0.5 316. Methods for adjusting hard thresholds are predicated on the assumption that the indicativeness of alert increases with the greater the distance a data value is from a hard threshold. For example, consider two sets of consecutive data values that violate the same hard threshold. It is assumed that the user will rate the indicativeness of the alert associated with the set located farther from the hard threshold more critical than the indicativeness of the alert for the set located closer to the hard threshold.

For this particular example survey questions in FIG. 3, the feedback statistic have a feedback resolution of five, which corresponds to the five ways the user may answer each question. A survey questions with only two possible answers, such as "like" (1.0) of "dislike" (0.0) answers, represents the minimum in user feedback because there are only two ways a user may indicate their level of satisfaction. In this case, the feedback resolution is two with no intermediate values that may used to indicate varying degrees of user satisfaction.

Alternatively, indirect collection of feedback statistics may be obtained by tracking a user's activities for each alert. Any indirect feedback that can be tracked over time may also be mapped to values in the interval [0,1]. For example, a user's activities after an alert many be monitored and certain actions counted and normalized to determine feedback statistics for each alert.

Methods for Calculating Confidence and Weighted Average of Feedback Statistics In a data-agnostic approach to adjusting a hard threshold, beliefs are applied directly without user experience or expertise of direct or indirect feedback consideration. Consider a set of beliefs associated with a user's assessment of an alert given by:

$$B=\{B_{al}, B_{crit}, B_{time}, B_{dur}\} \quad (1)$$

where $B_{al}$ represents a belief about the indicativeness of the alert;
$B_{crit}$ represents a belief about the criticality of the alert;
$B_{time}$ represents a belief about timeliness of the alert (i.e., wait interval); and
$B_{dur}$ represents a belief about the duration of the alert (i.e., cancellation interval).

In the follow description, each belief in the set B is represented by $B_i$, where the index i represents "al," "crit," "time," and "dur." Each belief $B_i$ represents a statement, truth, law, or expert knowledge about an alert presented to a user or any statement, truth, law, or expert knowledge learned data agnostically about an alert presented to a user. The beliefs may also be represented by probabilities. For example, each beliefs in the set B may be represented by a value in the interval $0 \leq B_i \leq 1$, with "1" representing a maximum confidence in a statement, truth, law, or expert knowledge about an alert presented to a user, and "0" representing no confidence in a statement, truth, law, or expert knowledge about the alert presented to the user.

Feedback statistics for the belief $B_i$ are collected after each alert to form a set of feedback statistics $$F(B_i)=\{f_1(B_i), \ldots, f_K(B_i)\}=\{f_k(B_i)\}_{k=1}^{K} \quad (2)$$

where subscript k is an integer feedback statistic index;
$f_k(B_i)$ is the k-th feedback statistic for the belief $B_i$; and
K is an integer number of feedback statistics.

Each feedback statistic $f_k(B_i)$ in the set of feedback statistics corresponds to a value in the interval [0,1]. For example, the k-th feedback statistics for the answers to the survey questions in FIG. 3 are $f_k(B_{al})$=0.5, $f_k(B_{crit})$=0.5, $f_k(B_{time})$=1.0, and $f_k(B_{dur})$=0.25. In other words, four sets of feedbacks statistics $F(B_{al})$, $F(B_{crit})$, $F(B_{time})$, and $F(B_{dur})$ are generated for K alerts. Because the feedback statistics are collected at different times, the feedback statistics may also be considered a collection of time-dependent feedback statistics denoted by $$F(B_i)=\{f(t_k,B_i)\}_{k=1}^{K}=\{f_k(B_i)\}_{k=1}^{K} \quad (3)$$

where $t_k$ represents the time at which the feedback statistics where generated.

Figure 4:
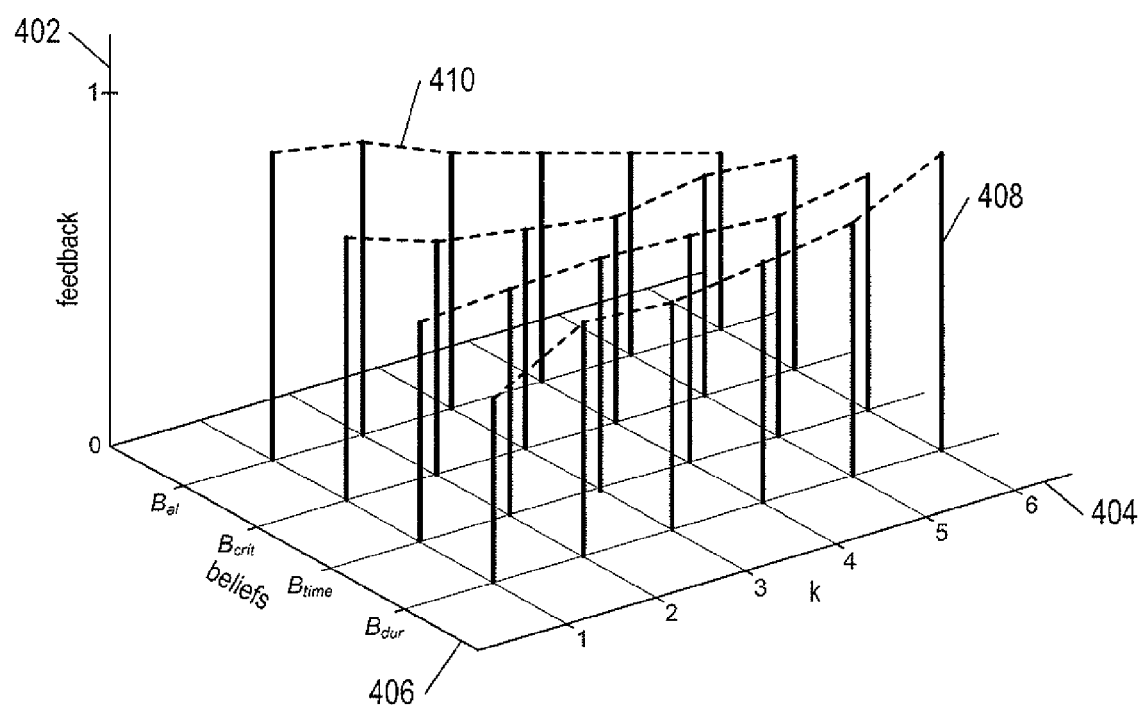
FIG. 4 shows an example plot of feedback statistics collected after six alerts.

FIG. 4 shows an example plot of feedback statistics collected after six different alerts. Vertical axis 402 represents feedback statistics values in the interval [0,1]. Axis 404 represents k, and axis 406 represents the beliefs $B_{al}$, $B_{crit}$, $B_{time}$, and $B_{dur}$. Bars extending perpendicular from the k-beliefs plane represent feedback statistics associated with each belief. For example, bar 408 represents the feedback statistic $f_6(B_{dur})$. The varying height of the bars as indicated by dashed lines, such as dashed lines 410, represent how feedback statistics for a particular belief may vary after each alert. For example, the feedback statistic associated with the belief $B_{al}$ is trending down, which indicates that a user finds the alerts less indicative of a problem over time.

Based on the set of feedback statistics $F(B_i)$ a convergence evaluation in user opinion is made and a confidence value $C(B_i)$ is calculated. The confidence value $C(B_i)$ supports the degree of validity of the initial belief $B_i$. The method used to adjust a hard threshold, criticality, wait interval, and cancellation interval described below is predicated on three postulates:

1) The posting of feedback statistics is assumed to be a process with increasing degree of importance with respect to time (in particular, an independent and identically distributed process);
2) When there is no convergence in user feedback statistics, the hard threshold, criticality, wait interval, and cancellation interval are not updated;
3) When there is a convergence to some degree of user feedback, the hard threshold, criticality, wait interval, and cancellation interval are adjusted according to the corresponding calculated confidence values.

The feedback convergence is estimated by processing the feedback statistics with weighted importance based on time and measuring the uncertainty. In other words, if the confidence is low enough, a bias in weighted opinion statistics is estimated. Weighted statistics of a past series of feedback statistics may be calculated at each time $t_r$ when an alert is generated as follows:

$$S(f_k(B_i)) = \frac{\sum_{r=1}^{k} w(t_r) f_r(B_i)}{\sum_{r=1}^{k} w(t_r)} \quad (4)$$

where $w(t_r)$ is a weight function.

The weighted statistic values lie within the interval [0,1] (i.e., $0 \leq S(f_k(B_i)) \leq 1$). The weight function ranges from 0 to 1 over a time domain 0 to $t_k$. The weight function is selected to place more weight or influence on feedback statistics collected later in time than on feedback statistics collected earlier in time. In other words, the weighted statistic given by Equation (4) is a time-dependent weighted mean of the feedback statistics collected over time between 0 and $t_k$ with more weight placed on feedback statistics collected later in time. For example, the weight function is selected to give the feedback statistic $f_y(B_i)$ more weight in Equation (4) than the feedback statistic $f_x(B_i)$, where $0 \leq t_x < t_y \leq t_k$. An example of a weight function $w(t_r)$ that places more weight on feedback statistics collected later in time is an exponential weight function given by:

$$w(t_r) = \begin{cases} 1 & \text{for } r = k \\ e^{-(t_k - t_r)} & \text{for } r < k \end{cases} \quad (5)$$

Alternatively, another example of a weight function $w(t_r)$ that places more weight on feedback statistics collected later in time is a linear weight function given by:

$$w(t_r) = \frac{1}{t_k} \cdot t_r \quad (6)$$

where $0 \leq t_r \leq t_k$. In an alternative implementation, the feedback statistics may all be given equal weight (i.e., $w(t_r)=1$).

Figure 5:
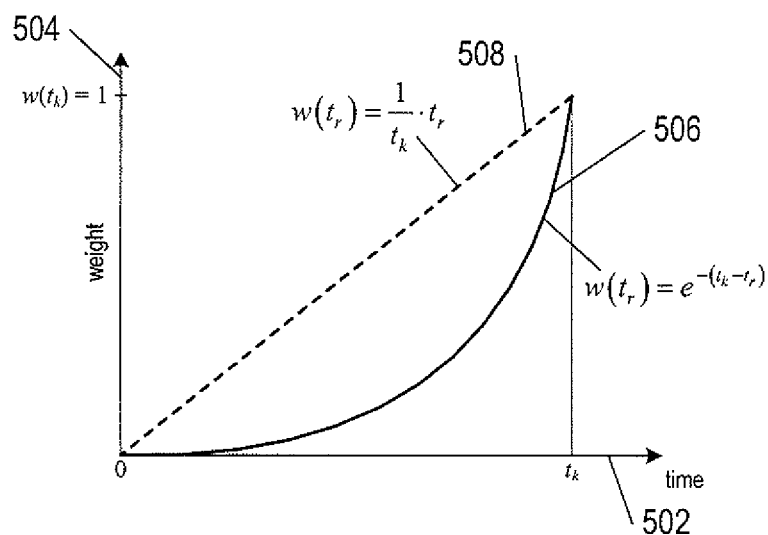
FIG. 5 shows a plot of two exponential weights functions.

FIG. 5 shows a plot of the exponential weight function in Equation (5) and a plot of the linear weight function in Equation (6). Horizontal axis 502 represents time $t_r$ and vertical axis 504 represents the value of the weight function $w(t_r)$, which ranges from 0 to 1. Curve 506 represents the exponential function given by Equation (5), and dashed line 508 represents the linear function given by Equation (6). Both weight functions are 0 at time 0 and increase to a value of 1 at time $t_k$. In other words, the weight functions represented by Equations (5) and (6) place more weight on feedback statistics collected later in time than on feedback statistics collected earlier in time with the most current weight $w(t_k)$ having a value of 1.

A set of weighted statistics obtained over a time interval from 0 to $t_K$ is given by $$\overline{S}(B_i) = \{S(f_1(B_i)), \ldots, S(f_K(B_i))\} \quad (7)$$

The weighted statistic values range over the interval [0,1], which is divided into l subintervals. The weighted statistics in the set of weighted statistics $\overline{S}(B_i)$ are binned according to which subinterval of the interval [0,1] the weighted statistics values fall within. The number of subintervals l of the interval [0,1] corresponds to the resolution of the requested feedback statistics. For example, if binary like/dislike user feedback is expected, then l=2 is selected. In this case, the feedback statistics may be 0 or 1 and the interval [0,1] may be partitioned into two subintervals [0,0.5) and [0.5,1]. On the other hand, if 5 possible feedback statistics are expected, as described above with reference to FIG. 3, then l=5 is selected. In this case, the feedback statistics may be 0, 0.25, 0.5, 0.75, and 1, as described above with reference to the example survey question of FIG. 3, and the weighted statistics fall into five subintervals [0,0.20), [0.20, 0.40), [0.40,0.60), [0.60,0.80), and [0.80,1]. Note that the subintervals do not have to be of the same length.

Figure 6:
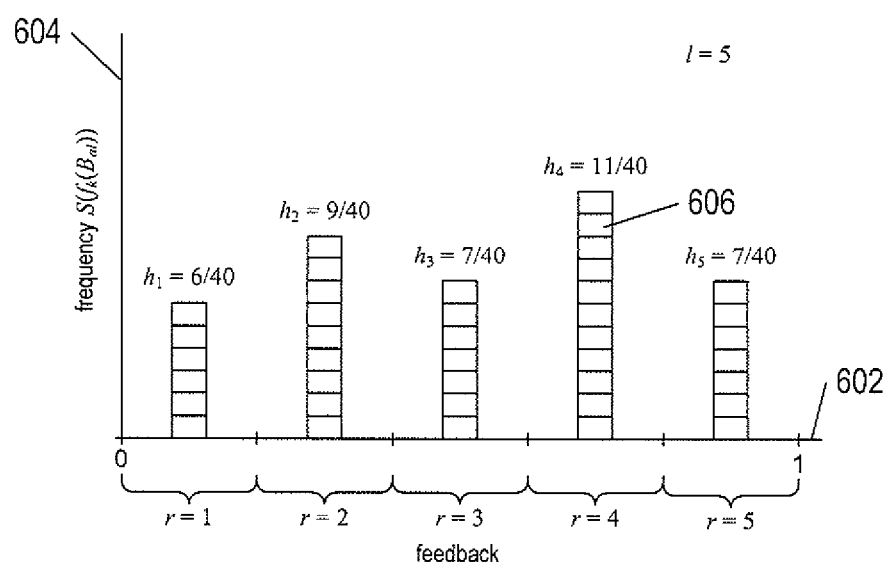
FIG. 6 shows an example distribution/histogram of weighted statistics binned into five subintervals.

FIG. 6 shows an example distribution/histogram for 40 weighted statistics for the belief $B_{al}$ binned into five subintervals (i.e., l=5) of the interval [0,1]. Horizontal axis 602 represents the weighted statistical values in the interval [0,1], and vertical axis 604 represents the frequency or count of the weighted statistics within the five subintervals identified by subinterval index r=1, 2, 3, 4, and 5. Boxes, such as box 606, represent 40 weighted statistics in set $\overline{S}(B_{al})$ (i.e., K=40) binned according to which subinterval the weighted statistic falls within. For example, six of the 40 weighted statistic values in the set $\overline{S}(B_{al})$ lie within subinterval r=1.

The fraction of weighted statistics that lie within each subinterval of the histogram of weighted statistic in FIG. 6 are normalized frequencies denoted by $h_r$. In other words, in general, $\sum_{r=1}^{l} h_r = 1$. For example, in FIG. 6, the normalized frequencies for each of the subintervals are given by:

$$\{h_1, h_2, h_3, h_4, h_5\} = \left\{\frac{6}{40}, \frac{9}{40}, \frac{7}{40}, \frac{11}{40}, \frac{7}{40}\right\}$$

Uncertainty in the weighted statistics of Equation (4) may be determined by calculating the entropy of the normalized frequencies:

$$H(\overline{S}(B_i)) = -\sum_{r=1}^{l} h_r \log_l h_r \quad (8)$$

where $\sum_{r=1}^{l} h_r = 1$.

Note that the entropy calculated according to Equation (8) satisfies the condition $0 \leq H(\overline{S}(B_i)) \leq 1$ Next, confidence in a belief $B_i$ is calculated based on the entropy. When the entropy $H(\overline{S}(B_i))$ is less than or equal to an uncertainty threshold denoted by $U_{th}$ (i.e., $H(\overline{S}(B_i)) \leq U_{th}$), the uncertainty in the feedback statistics associated with the belief $B_i$ is low and the confidence in the belief $B_i$ may be calculated as a function of the entropy as follows:

$$C(B_i) = 1 - H(\overline{S}(B_i)) \quad (9)$$

On the other hand, when the entropy $H(\overline{S}(B_i))$ is greater than the uncertainty threshold $U_{th}$ (i.e., $H(\overline{S}(B_i)) > U_{th}$), the uncertainty in the feedback statistics associated with the belief $B_i$ is high and the confidence is given by:

$$C(B_i) = 0 \quad (10)$$

An example of a suitable uncertainty threshold value is:

$$U_{th} = -\frac{1}{3} \log_l \frac{1}{3} - \frac{2}{3} \log_l \frac{2}{3} \quad (11)$$

The uncertainty threshold characterized by Equation (11) corresponds to a histogram of weighted statistics in which l−2 subintervals of the interval [0,1] contain 0 weighted statistics and two other subintervals have ⅓ and ⅔ of the weighted statistics, respectively, which is a case of acceptable uncertainty in feedback statistics. When the entropy is greater than $U_{th}$, there is no convergence in user opinion and the corresponding confidence should be at the minimum (i.e., $C(B_i)=0$)). Because the entropy is normalized, in alternative implementations the uncertainly threshold $U_{th}$ may be assigned a value in the interval $(\frac{1}{2}, 1]$ (e.g., a value close to 1).

The average of the weighted statistics in the set $\overline{S}(B_i)$ is calculated according to $$m_i(h_{max}) = \frac{1}{K} \sum_{k=1}^{K} S(f_k(B_i)) \quad (12)$$

The mode of the histogram of weighted statistics is given by $$h_{max} = \max\{h_1, \ldots, h_l\} \quad (13)$$

In other words, the mode $h_{max}$ of the histogram of the set $\overline{S}(B_i)$ is the largest normalized frequency of weighted statistics and corresponds to the subinterval, called the "modal subinterval," which is the subinterval with the largest number of weighted statistics. For example, in FIG. 6, the mode $h_{max}$ is $h_4=11/40$ and the modal subinterval is $r=4$. The mode $h_{max}$ takes into account the degree of importance in time of the weighted statistic values that lie within the modal subinterval of the histogram. When the uncertainty $H(\overline{S}(B_i))$ is less than or equal to the uncertainty threshold $U_{th}$, the confidence $C(B_i)$ is calculated according to Equation (9) by checking which subinterval contains the bias in uncertainty. The subinterval with the largest bias in uncertainty corresponds to the mode of the histogram, $h_{max}$.

Methods for Calculating an Adjusted Hard Threshold

Feedback-based adjustments of a hard threshold may be executed when a sufficient number of alerts with feedback statistics have been collected from a user and a sufficient number of feedback statistics associated with other users have been collected. In particular, methods for adjusting a hard threshold may be executed when the following two conditions are satisfied:

1. The minimum number of alerts with feedback statistics is a; and
2. At least 25% of users produced feedback statistics that satisfy $$b\frac{\|f\|}{U} \leq \|f_u\| \quad (14)$$

where U is the total number of users;
$\|f\|$ is the number of all available feedbacks;
$\|f_u\|$ is the number of feedbacks generated by user u; and
b>0 is parameter with default value 1 that may be set to require at least b-times the average feedback per user (i.e., $\|f\|/U$) for some portion of the users.

Assuming the two conditions for having enough feedback statistics associated with other users are satisfied, the method then proceeds to determining whether or not a hard threshold should be adjusted. Consider adjusting an upper hard threshold D, such as the upper hard threshold D 212 described above with reference to FIG. 2. The confidence $C(B_{al})$ is calculated from the feedback statistics $F(B_{al})$ according to Equation (9). When the confidence $C(B_{al})$ equals zero, the upper hard threshold is not adjusted. On the other hand, when the confidence $C(B_{al})$ is greater than zero, the average $m_{al}(h_{max})$ of the set of weighted statistics $\overline{S}(B_{al})$ is calculated according to Equation (12).

Next, the user noise tolerance N is compared with a noise degree at the user (i.e., a noise degree) quantified by $$(1-m_{al}(h_{max})) \quad (15)$$

The noise degree is an estimate of the actual noise degree that the feedback statistics obtained from the users indicate. The noise degree is equal to "0" when all alerts are rated perfectly. Otherwise, the noise degree indicates a departure from perfection. The noise degree is compared with the user's selected noise tolerance N to determine whether or not the alerts generated by violating the hard threshold D satisfy the user's tolerance for false positive alerts. In particular, when the difference between the noise degree and the user's noise tolerance N satisfies the following condition $$|(1-m_{al}(h_{max}))-N| \leq \delta \quad (16)$$

with a tolerance parameter $\delta$ (e.g., $\delta=0.01$), the noise degree $(1-m_{al}(h_{max}))$ is sufficiently close to the user noise tolerance N that the hard threshold D is left unchanged. Alternatively, when the difference satisfies the following condition $$(1-m_{al}(h_{max}))-N < -\delta \quad (17)$$

the noise degree is too low, or when the difference satisfies the following condition $$(1-m_{al}(h_{max}))-N > \delta \quad (18)$$

the noise degree is too high. When one of the conditions represented by Equations (17) and (18) is satisfied, the hard threshold D is adjusted.

Consider the case where the noise degree $(1-m_{al}(h_{max}))$ satisfies the condition represented by Equation (17). As a result, the hard threshold is decreased to a lower hard threshold, which may trigger one or more alerts from the time-series data that were not generated for the previous hard threshold. Because feedback statistics were not generated for alerts triggered as a result of decreasing the hard threshold to a lower hard threshold for the existing time-series of data, estimated feedback statistics regarding indicativeness of newly created/appeared alerts for the existing time-series of data are extrapolated from feedback statistics generated by the users for rated alerts based on the previous threshold value. As a result, the feedback statistics generated by users for the rated alerts are collected into an array.

Figure 7:
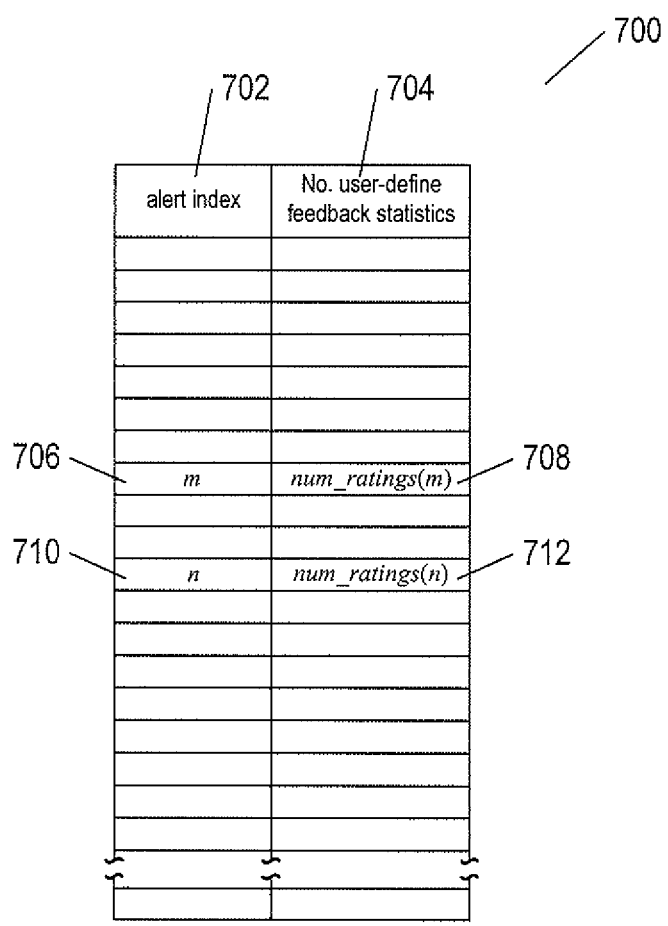
FIG. 7 shows an example table of differently rated alerts.

FIG. 7 shows an example of a table 700 of differently rated alerts. Column 702 is a list alert indices and column 704 is a list of the number of feedbacks or number of ratings collected for each alert. For example, the number of feedbacks collected for the m-th alert 706 is represented by num_rating(m) 708, and the number of feedbacks collected for the n-th alert 710 is represented by num_rating(n) 712.

After the feedback statistics have been assembled into an array, an average of feedbacks counts per alert is calculated as follows:

$$n(f) = \frac{\sum_{m=1}^{M} \text{num\_ratings}(m)}{M} \quad (19)$$

where M is the number of alerts ever rated; and
num_ratings(m) is the number of feedback statistics generated for the m-th alert.

The average of feedback counts $n(f)$ is rounded to its integer part (i.e., truncated). Alternatively, the average of feedback counts may be rounded to its nearest integer.

Next, the hard threshold D is iteratively decreased by initially setting a lower hard threshold $D_{low}$ equal to the hard threshold D and, for each iteration, calculating the lower hard threshold according to $$D_{low} = D_{low} - \epsilon \quad (20)$$

where $\epsilon > 0$ is the step size that can be even in precision of nearest neighbor data point down.

For each iteration that the lower hard threshold is decreased, the number of alerts generated from the existing time-series of data potentially increases.

Figure 8:
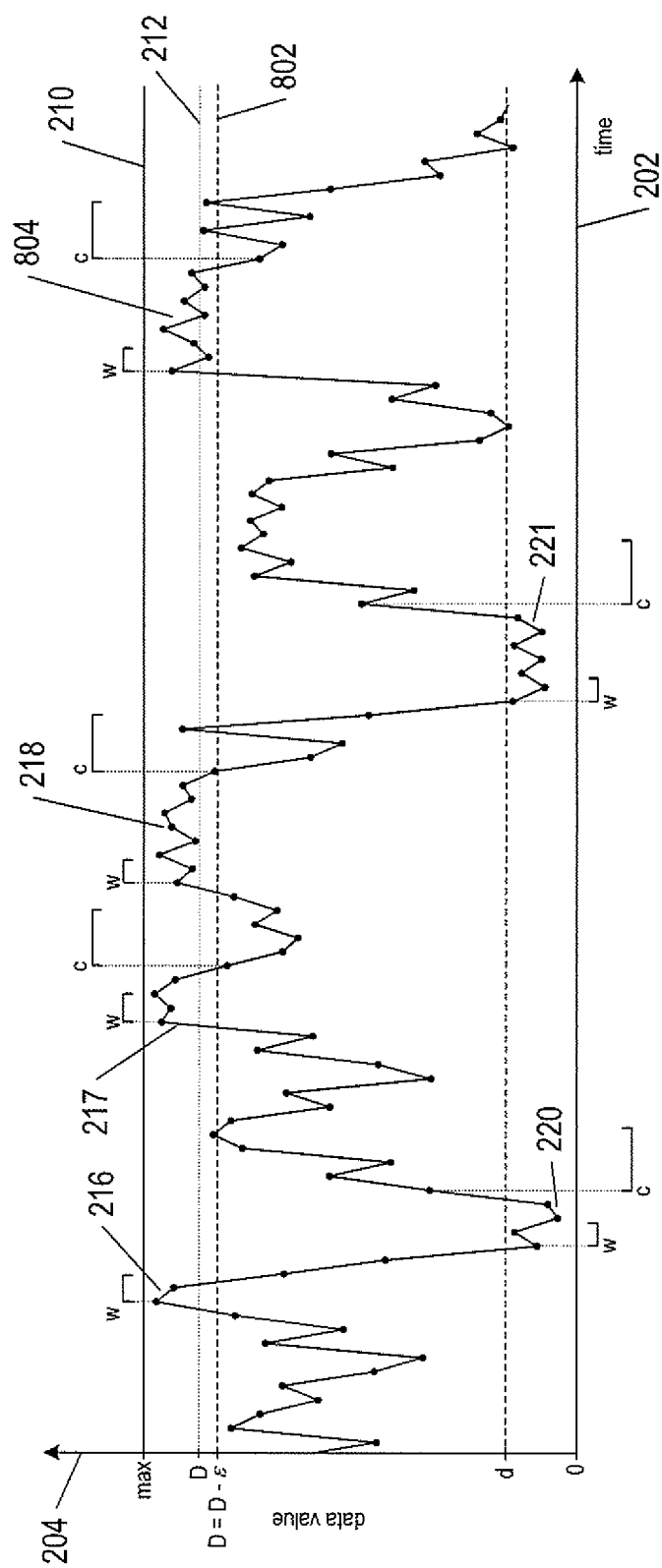
FIG. 8 shows a plot of time-series data with a lower hard threshold.

FIG. 8 shows the plot of time-series data shown in FIG. 2 with the hard threshold decreased to lower hard threshold represented by dashed line 802. As a result, a new set of consecutive data 804 is greater than the lower hard threshold 802 with the number of consecutive data points greater than the length w, which generates a new alert. The new alert is maintained because the number of consecutive data points below the lower hard threshold is less than the duration c. As a result, estimated feedback statistics regarding indicativeness of the new alert associated with the set 804 are extrapolated from feedback statistics associated with the real rated alerts.

Figure 9:
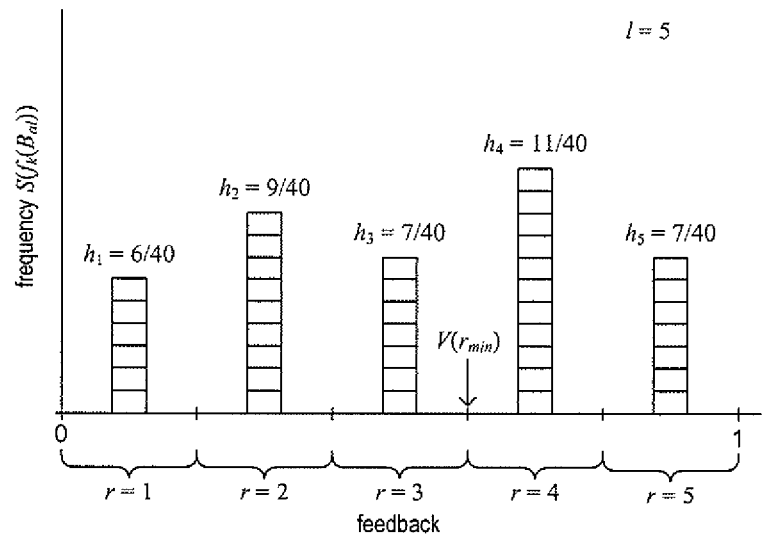
FIG. 9 shows a weight statistic histogram with lower bound of the modal interval identified.

When a new alert is generated as a result of a lower hard threshold, estimated feedback statistics for the alert belief $B_{al}$ are formed from lower bounds, $V_{al}(r_{min})$, of the model subintervals the weighted statistic histograms. For example, FIG. 9 shows the weight statistic histogram for belief $B_{al}$ shown in FIG. 6. As described above with reference to FIG. 6, the subinterval r=4 is the modal subinterval with the largest number of weighted statistics counts at 11. The lower bound of the subinterval r=4 is denoted by $V(r_{min})$. The lower bound $V(r_{min})$ is added as a feedback statistics n(f) times to the set of feedback statistics.

The estimated feedback statistics for the new alerts are added to the set of feedback statistics $F(B_{al})$ represented by Equation (2) to give an enlarged set of feedback statistics $$F_{\overline{K}}(B_{al}) = \{f_1(B_{al}), \ldots, f_K(B_{al}), f_{K+1}(B_{al}), \ldots, f_{\overline{K}}(B_{al})\} \quad (21)$$

where $f_{K+1}(B_{al}) = V(r_{min})$ for $1 \leq l \leq \overline{K}$; and
$\overline{K} = K + K_{new} n(f)$, where $K_{new}$ is the number of newly appeared hypothetical alerts.

Weighted statistics for the set $F_{\overline{K}}(B_{al})$ are calculated according to Equation (4) to give a set of weighted statistic given by $$\overline{S}_{\overline{K}}(B_{al}) = \{S(f_1(B_{al})), \ldots, S(f_{\overline{K}}(B_{al}))\} \quad (22)$$

The average of the weighted statistics in the set $\overline{S}_{\overline{K}}(B_{al})$ is calculated according to $$m_{al}(h_{max}) = \frac{1}{\overline{K}}\left(\sum_{l=1}^{\overline{K}} S(f_l(B_{al}))\right) \quad (23)$$

A noise degree $(1 - m_{al}(h_{max}))$ is calculated for the belief $B_{al}$ and compared with the user's noise tolerance N. When the condition given by Equation (17) is satisfied, the hard threshold is lowered again according to Equation (20) and the operations described for Equations (21)-(23) are repeated for the lower hard threshold. On the other hand, when the condition given by Equation (16) is satisfied or when a noise degree maximum close to N is reached a fixed number of iterations P, the adjusted hard threshold is calculated according to $$D = (1 - C(B_{al}))D + C(B_{al})D_{low} \quad (24)$$

Figure 10:
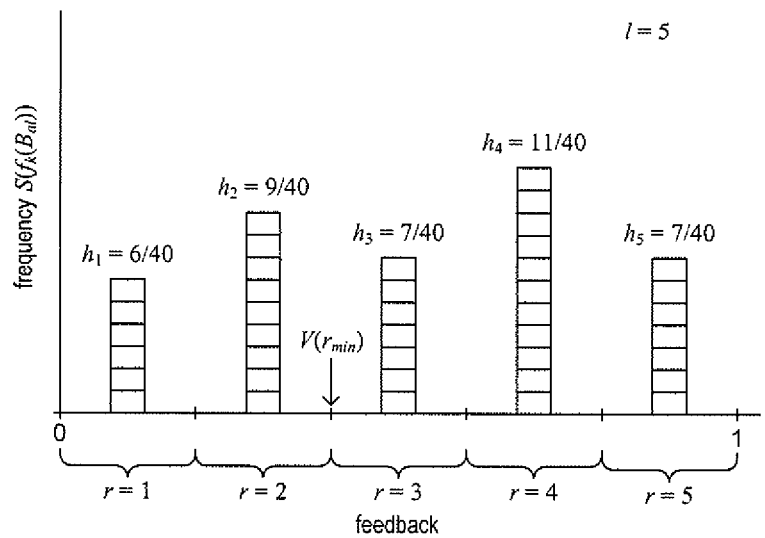
FIG. 10 shows a weight statistic histogram with a lower bound of an interval identified.

Alternatively, if condition given by Equation (16) is still not satisfied and if $$M_{al}(h_{max}) - V(r_{min}) \leq \delta \quad (25)$$

then $V(r_{min})$ is reset to the lower bound of the lesser valued subinterval adjacent to the modal interval. For example, FIG. 10 shows the weight statistic histogram for belief $B_{al}$ shown in FIG. 6. As described above with reference to FIG. 6, the subinterval r=4 is the modal subinterval with the largest number of weighted statistics counts at 11. The lesser valued subinterval adjacent to the modal subinterval r=4 is the subinterval r=3. The lower bound of the lesser valued subinterval r=3 is identified by $V(r_{min})$.

For each iteration in which the hard threshold is lowered according to Equation (20), an alert confidence $C(B_{al})$ is calculated. A weighted statistics histogram is formed from the set of weighted statistics $\overline{S}_{\overline{K}}(B_{al})$ which gives a set of normalized frequencies $\{h'_r\}$ determined from the l subintervals of the histogram. The entropy is calculated for the normalized frequencies according to $$H(\overline{S}_{\overline{K}}(B_{al})) = -\sum_{r=1}^{l} h'_r \log_l h'_r \quad (26)$$

When $H(\overline{S}_{\overline{K}}(B_{al})) \leq U_{th}$, the confidence includes contributions from feedback statistics associated with the new alerts is calculated according to $$C(B_{al}) = 1 - H(\overline{S}_{\overline{K}}(B_{al})) \quad (27)$$

Otherwise, the confidence is given by $$C(B_{al}) = 0 \quad (28)$$

When the alert confidence $C(B_{al})$ is greater than zero (i.e., $C(B_{al}) > 0$), the noise degree is calculated according to Equation (15) using the average of the weighted statistics given by Equation (27). If the noise degree satisfies the condition given by Equation (17), the iteration stops. Otherwise, the iteration stops for the maximum noise degree estimate closest to N.

Consider the case in which the noise degree $(1 - m_{al}(h_{max}))$ satisfies the condition represented by Equation (18). In this case, the hard threshold D is iteratively increased. Initially, a higher hard threshold $D_{high}$ is set equal to the hard threshold D, and for each iteration, the higher hard threshold is increased according to $$D_{high} = D_{high} + \epsilon \quad (29)$$

For each iteration, the number of previous alerts potentially decreases.

Figure 11:
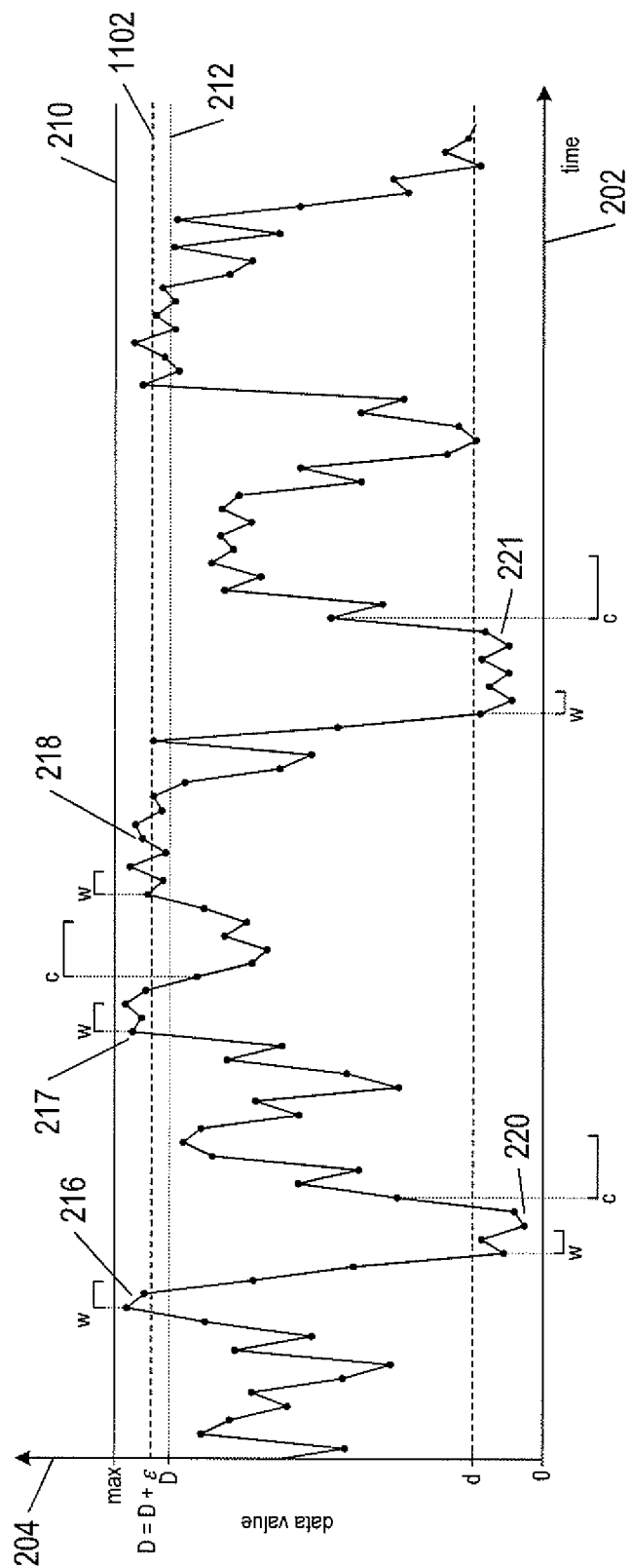
FIG. 11 shows a plot of time-series data with a higher hard threshold.

FIG. 11 shows the time-series plot of data shown in FIG. 2 with the hard threshold increased by the parameter £ to a higher hard threshold represented by dashed line 1102. As a result, not all of the data values in the set of consecutive data 218 are greater than the higher hard threshold 1102. As a result, the alert associated with the set 218 is eliminated and the feedback statistics associated with the alert are removed from the set of feedback statistics $F(B_{al})$.

After each iterative increase of the hard threshold, the time-series data is reexamined to reform the set of feedback statistics. Feedback statistics collected after previous alerts that were associated with data above a previous hard threshold but are not above a current higher hard threshold are removed from the set of feedback statistics to give a reduced set of feedback statistics associated with the higher hard threshold $$F_J(B_{al}) = \{f_1(B_{al}), \ldots, f_J(B_{al})\} \quad (30)$$

where J is the number of all ratings (i.e., $J \leq K$).

The set of feedback statistics $F_J(B_{al})$ includes only the feedback statistics associated with alerts that would have been generated by data greater than the higher hard threshold.

Next, the weighted statistics for the set $F_J(B_i)$ are recalculated according to Equation (4) to give a set of weighted statistic $$\overline{S}_J(B_i) \equiv \{S(f_1(B_{al})), \ldots, S(f_J(B_{al}))\} \quad (31)$$

The weighted statistics histogram is generated from the set $\overline{S}_J(B_i)$ to give a set of normalized frequencies $\{h''_r\}$ determined from the l subintervals of the histogram. The entropy is calculated for the normalized frequencies according to $$H(\overline{S}_J(B_{al})) = -\sum_{r=1}^{l} h''_r \log_l h''_r \quad (32)$$

When $H(\overline{S}_J(B_{al})) \leq U_{th}$, the confidence that includes contributions from feedback statistics associated with the new alerts is calculated according to $$C(B_{al}) = 1 - H(\overline{S}_J(B_{al})) \quad (33)$$

Otherwise, the confidence is given by $$C(B_{al}) = 0 \quad (34)$$

The average of the weighted statistics in the set is calculated according to $$m_{al}(h_{max}) = \frac{1}{J}\left(\sum_{j=1}^{J} S(f_j(B_{al}))\right) \quad (35)$$

A noise degree $(1-m_{al}(h_{max}))$ is calculated for the belief $B_{al}$ and compared with the user's noise tolerance N. When the condition given by Equation (18) is satisfied, the hard threshold is increased again according to Equation (29) and the operations described for Equations (30)-(35) are repeated for the higher hard threshold. On the other hand, when the condition given by Equation (16) is satisfied or after a fixed number iterations P, the adjusted hard threshold is calculated according to $$D = (1 - C(B_{al}))D + C(B_{al})D_{high} \quad (36)$$

It should be noted that if in increasing the hard threshold, results in the minimum number of alerts is less than a or the feedback statistics fails to satisfy the condition given by Equation (14), the procedure stops.

The criticality L, timeliness w, and duration c are also adjusted based on criticality confidence $C(B_{crit})$, timeliness confidence $C(B_{time})$, and duration confidence $C(B_{dur})$. When the hard threshold is left unchanged and satisfies the condition given in Equation (16), the confidences $C(B_{crit})$, $C(B_{time})$, and $C(B_{dut})$ are calculated according to Equations (9). When the hard threshold is decreased according to Equation (20), the confidences $C(B_{crit})$, $C(B_{time})$, and $C(B_{dut})$ are calculated according to Equations (9) and (10). When the hard threshold is increased according to Equation (29), the confidences $C(B_{crit})$, $C(B_{time})$, and $C(B_{dut})$ are calculated according to Equations (9) and (10).

When the criticality confidence $C(B_{crit}) > 0$, the average of the weighted statistics $m_{crit}(h_{max})$ is calculated and the criticality L is updated according to $$L = (1 - C(B_{crit}))L + c(B_{crit}) \cdot m_{crit}(h_{max}) \quad (37)$$

Otherwise, the criticality is left unchanged. When L=0, the alert is changed to "non-critical" or "none;" when $0<L\leq0.25$ the alert is changed to "informative;" when $0.25<L\leq0.5$ the alert is changed to "warning;" when $0.5<L\leq0.75$ the alert is changed to "immediate;" and when $0.75<L\leq1$ the alert is changed to "critical."

When the timeliness confidence $C(B_{time}) > 0$, the average of the weighted statistics $m_{time}(h_{max})$ is calculated. The wait time may initially be set to w=0.5. Assume that adjusting the wait time is controlled by a fraction $k_{wait}$. In general, the fraction $k_{wait}$ can vary within the interval $[0, +\infty)$, or, in particular, within the interval [0,1]. In other words, the wait time w varies from $w-k_{wait}w$ to $w+k_{wait}w$ under the condition that if $w-k_{wait}w<0$, then wait time is set to 0. The interval $[w-k_{wait}w, w+k_{wait}w]$ is mapped to the interval [0,1] by a linear function given by $$y = f(x) = \frac{1}{2k_{wait}w}x - \frac{w - k_{wait}w}{2k_{wait}w} \quad (38)$$

The wait time is updated according to Equation (38) by setting $$y = (1 - C(B_{time}))0.5 + C(B_{time}) \cdot m_{time}(h_{max}) \quad (39)$$

and taking the integer part to obtain w. Otherwise, when $C(B_{time})=0$, the wait time is left unchanged.

When the duration confidence $C(B_{dur}) > 0$, the average of the weighted statistics $m_{dur}(h_{max})$ is calculated. The duration may initially be set to c=0.5. Assume that adjusting the duration is controlled by a fraction $k_{dur}$. In general, the fraction $k_{dur}$ can vary within the interval $[0, +\infty)$, or, in particular, within the interval [0,1]. In other words, the duration c varies from $c-k_{dur}c$ to $c+k_{dur}c$ under the condition that if $c-k_{dur}c<0$, then the duration c is set to 0 The interval $[c-k_{dur}c, c+k_{dur}c]$ is mapped to [0,1] by a linear function given by $$z = h(x) = \frac{1}{2k_{dur}c}x - \frac{c - k_{dur}c}{2k_{dur}c} \quad (40)$$

The duration is updated according to Equation (40) by setting $$z = (1 - C(B_{dur}))0.5 + C(B_{dur}) \cdot m_{dur}(h_{max}) \quad (41)$$

and taking the integer part to obtain c. Otherwise, when duration confidence $C(B_{dur})=0$, the duration is left unchanged.

Figure 12:
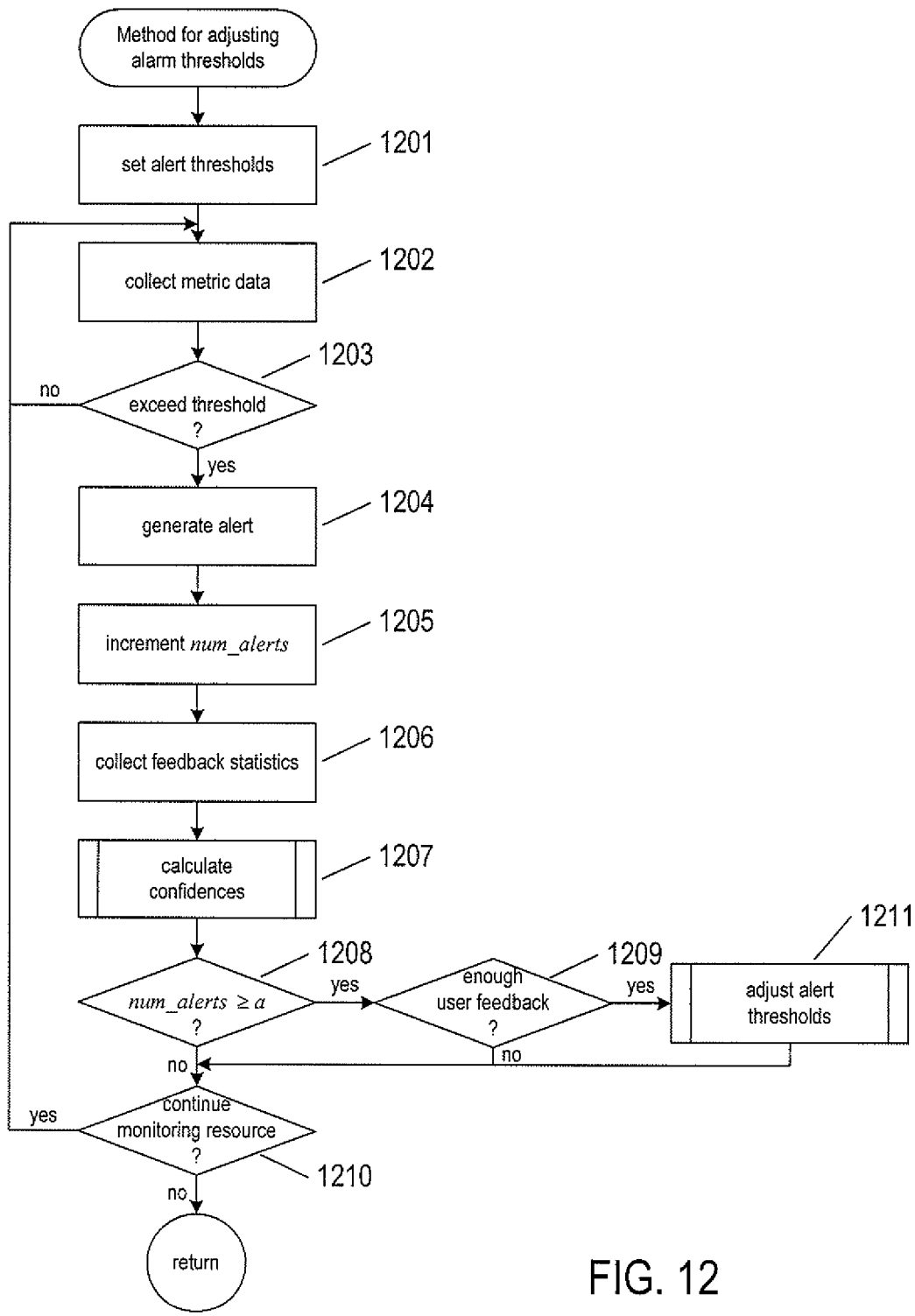
FIG. 12 shows a flow-control diagram of a method for adjusting a hard threshold.

FIG. 12 shows a flow-control diagram of a method for adjusting an upper hard threshold D. In block 1201, alert thresholds are initials. For example, a user may initially set the wait time w and duration c to 0.5 and set the criticality L to a value in the interval [0,1]. The user may also set values for a noise tolerance N, an upper hard threshold D, a tolerance parameter $\delta$, and a step size $\epsilon$. In block 1202, a time-series data for a resource is continuously collected as described above with reference to FIG. 2. In decision block 1203, when the data is greater than the hard threshold as described above with reference to FIG. 2, control flows to block 1204. Otherwise, control flows to block 1202 and data continues to be collected. In block 1204, an alert is generated. In block 1205, an alert count num-alerts is incremented. In block 1206, feedback statistics are collected from the user. The feedback statistics can answers to survey questions as described above with reference to FIG. 3 or obtained by monitoring the user's action after the is presented with an alert. In block 1207, a routine "calculate confidence" is called to calculate a confidence as described below with reference to FIG. 13. In decision block 1208, when number of alerts num_alerts is greater than the minimum number of alerts a control flows to decision block 1209. Otherwise, control flows to decision block 1210. Decision block 1209 determines whether or not enough feedbacks statistics have been collected according to Equation (14). When enough feedback statistics have been collected according to Equation (14), control flows to block 1211. Otherwise, control flows to decision block 1210. In decision block 1201, as long as the data continues to be monitored, the computational operations in blocks 1202-1209 are repeated. In block 1211, a routine "adjust alert thresholds" is called as described below with reference to FIG. 14.

Figure 13:
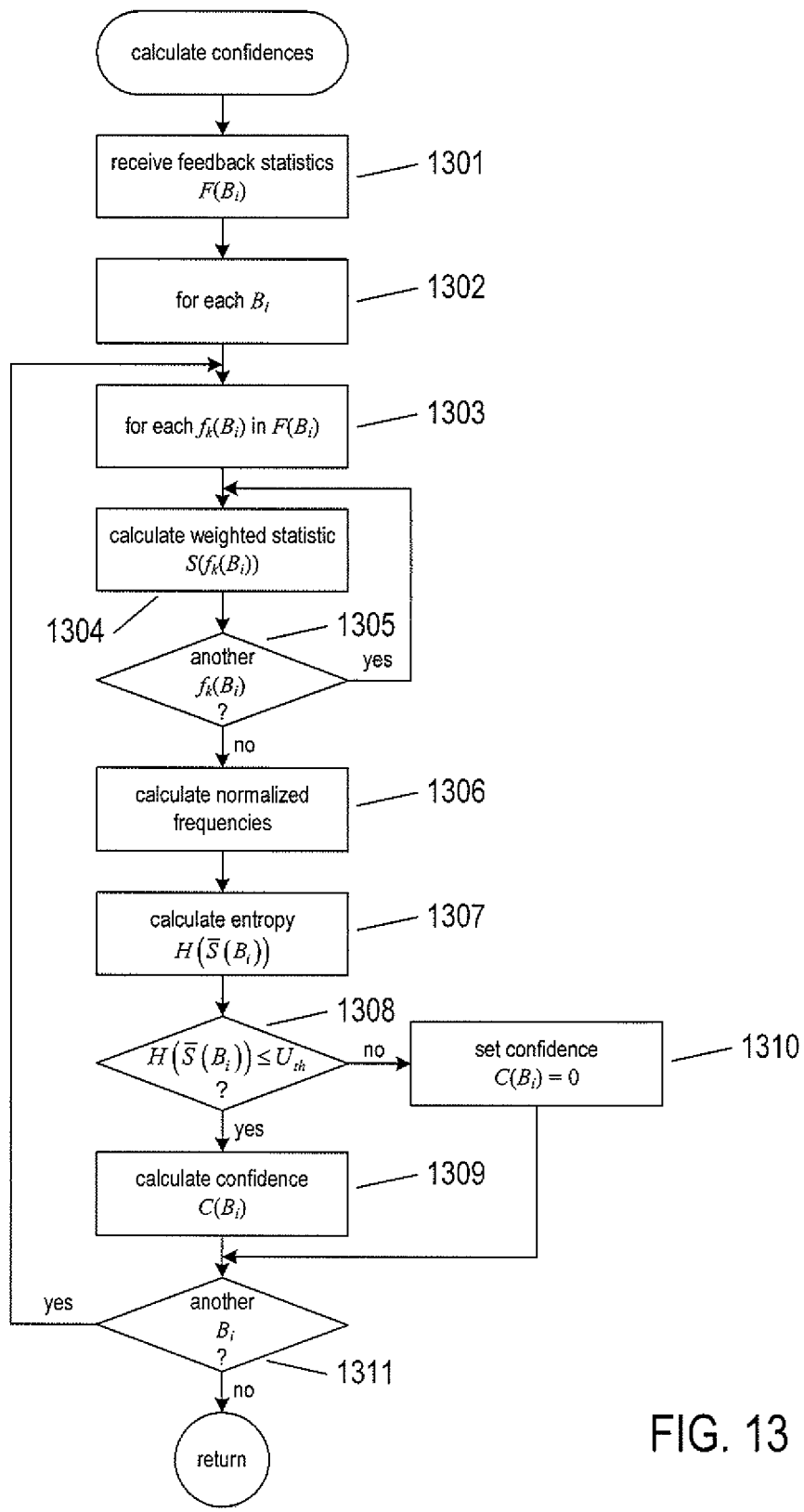
FIG. 13 shows a flow-control diagram of the routine "calculate confidences" called in block 1207 of FIG. 12.

FIG. 13 shows a flow-control diagram of the routine "calculate confidences" called in block 1207 of FIG. 12. In block 1301, a set of beliefs B given by Equation (1) and set of feedback statistics represented by Equation (2) are received. In block 1302, afar-loop repeats the computational operations of blocks 1303-1305 for each belief. In block 1303, a for-loop repeats the computational operations of blocks 1304 and 1305 for each feedback statistic $f_k(B_i)$ in a set of feedback statistics F(130 described above with reference to Equation (2). In block 1304, a weighted statistic $S(f_k(B_i))$ is calculated according to Equation (4). In block 1305, the method repeats the computational operation of block 1304 for another feedback statistic in the set $F(B_i)$ until a weighted statistic has been calculated for each of the feedback statistics in the set $F(B_i)$. The weighted statistic calculated according to blocks 1304 and 1305 form a set of weighted statistics $\overline{S}(B_i)$ as described above with reference to Equation (7). In block 1306, normalized frequencies are calculated for the set of weighted statistics based on a resolution l of the feedback statistics, as described above with reference to FIG. 6. In block 1307, the entropy $H(\overline{S}(B_i))$ of the set of weighted statistics is calculated based on the normalized frequencies according to Equation (8). In decision block 1308, when the entropy $H(\overline{S}(B_i))$ is less than an uncertainty threshold $U_{th}$, control flows to block 1309, otherwise, control flows to block 1310. The uncertainty threshold may be the uncertainty threshold given in Equation (11). In block 1309, a confidence value $C(B_i)$ may be calculated according to Equation (9) described above. In block 1310, the confidence value $C(B_i)$ is set to zero. In decision block 1311, the method repeats the computational operations of blocks 1303-1311 for another belief until a confidence has been calculated for each of the beliefs.

Figure 14:
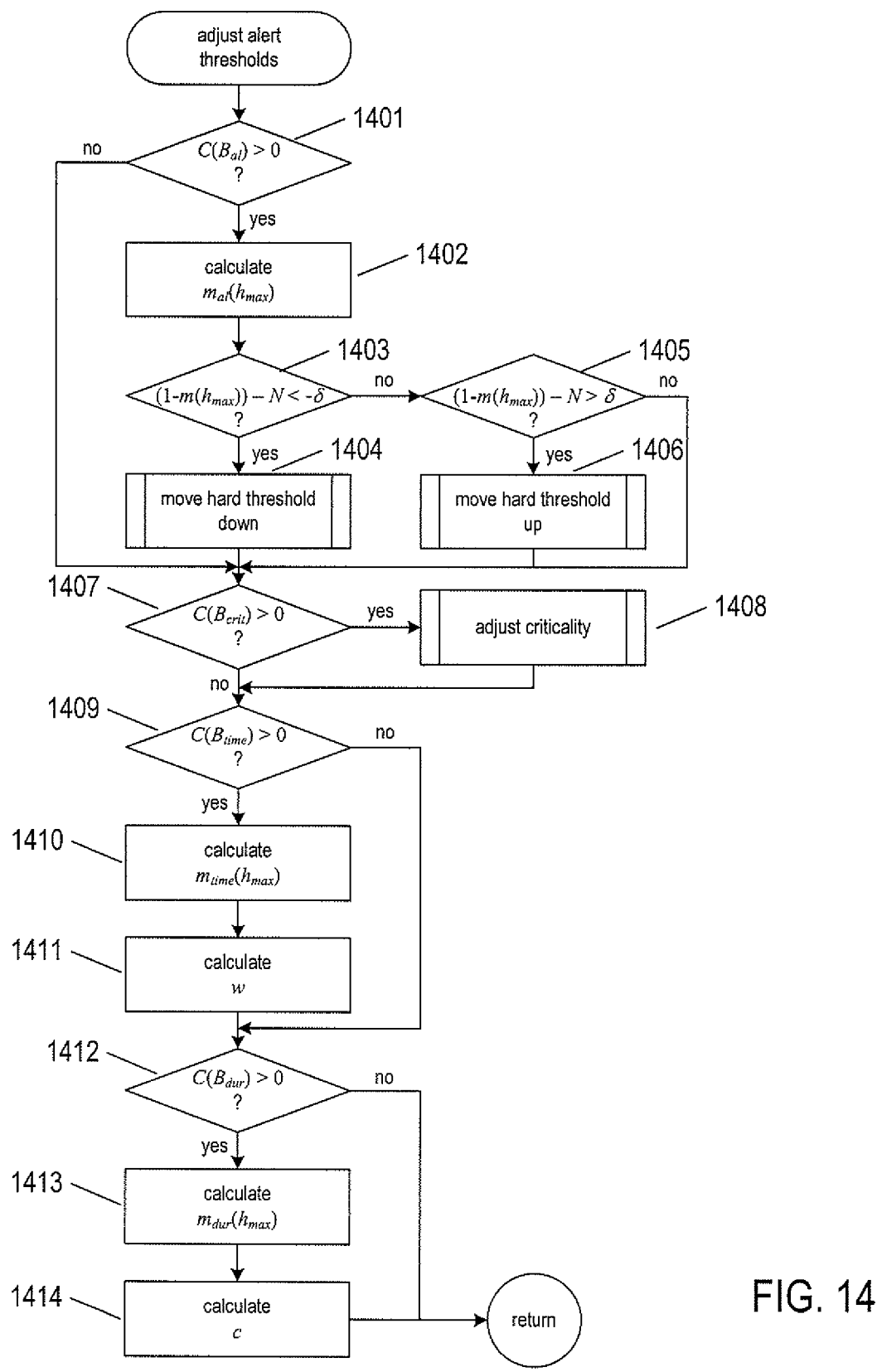
FIG. 14 shows a flow-control diagram of the routine "adjust alert thresholds" called in block 1211 of FIG. 12.

FIG. 14 shows a flow-control diagram of the routine "adjust alert thresholds" called in block 1211 of FIG. 12. When the confidence $C(B_{al})$ is greater than zero in decision block 1401, control flows to block 1402 in which the average of weighted statistics $m_{al}(h_{max})$ is calculated. Otherwise, control flows to decision block 1407. In decision block 1403, when the condition represented by Equation (17) is satisfied, control flows to block 1404. Otherwise, control flows to decision block 1405. In decision block 1405, when the condition represented by Equation (18) is satisfied, control flows to block 1406. Otherwise, control flows to decision block 1407. When the results of both decision blocks 1403 and 1405 are "no," the hard threshold is not adjusted, which is equivalent to satisfying the condition represented by Equation (16). In block 1405, a routine "move hard threshold down" is called as described below with reference to FIG. 15. In block 1406, a routine "move hard threshold up" is called as described below with reference to FIG. 16. The routines called in blocks 1404 and 1406 both calculate confidences $C(B_{crit})$, $C(B_{time})$, and $C(B_{dur})$ associated with either moving the hard threshold down or up as described above with reference to Equation (25) and Equation (34). In decision block 1407, when the criticality confidence $C(B_{crit})$ is greater than zero, control flows block 1408 in which a routine "adjust criticality" is called as described below with reference to FIG. 17. Otherwise, control flows to decision block 1409 and the criticality is not adjusted. In decision block 1409, when timeliness confidence $C(B_{time})$ is greater than zero, control flows to block 1410. Otherwise, control flows to decision block 1412 and the timeliness w is not adjusted. In block 1410, the average of weighted statistics for timeliness $m_{time}(h_{max})$ is calculated. In block 1411, the timeliness is adjusted as described above with reference to Equation (40). In decision block 1412, when duration confidence $C(B_{dur})$ is greater than zero, control flows to block 1413. Otherwise, the duration c is not adjusted. In block 1413, the average of weighted statistics for duration $m_{dur}(h_{max})$ is calculated. In block 1414, the duration is adjusted as described above with reference to Equation (42).

Figure 15:
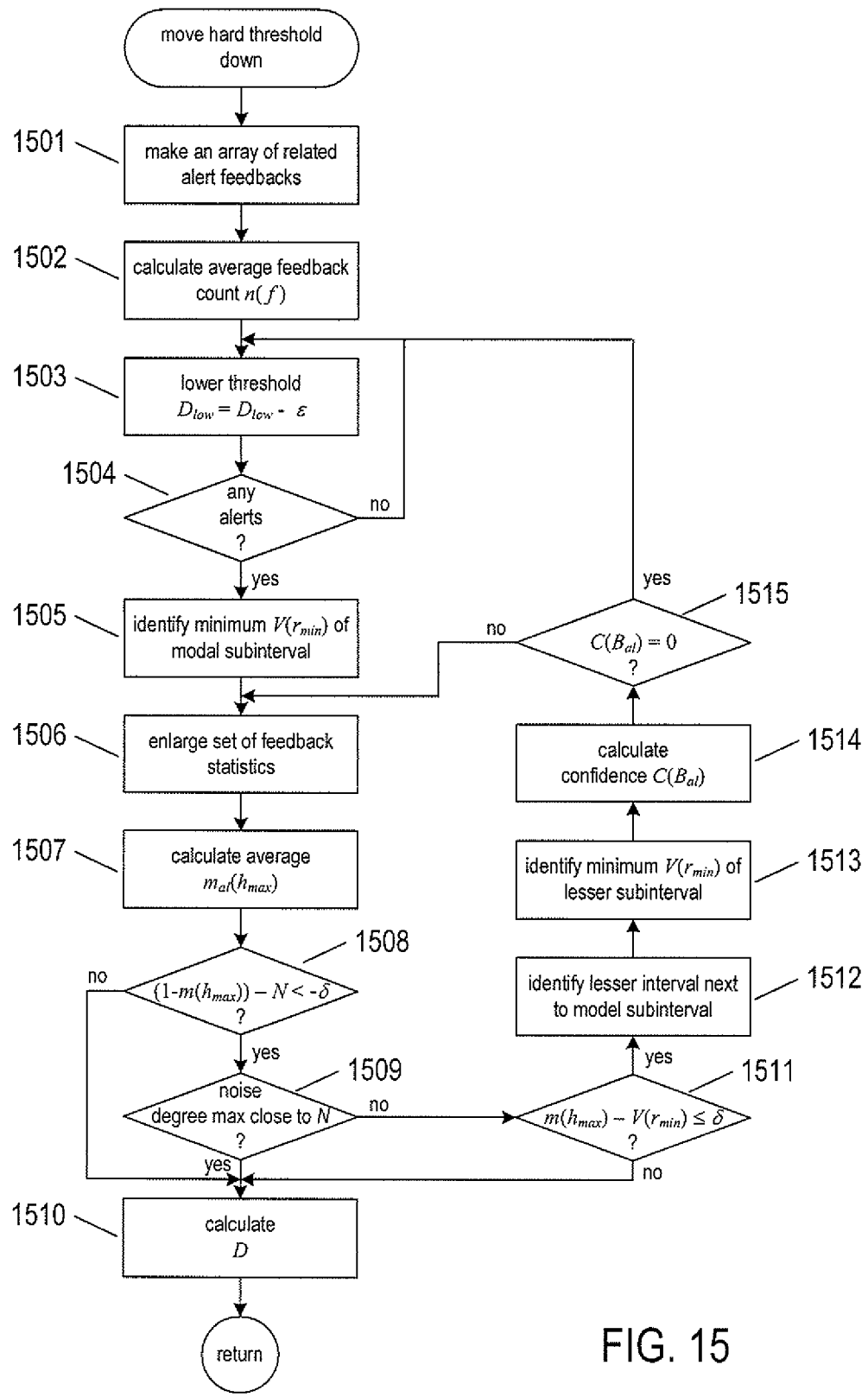
FIG. 15 shows a flow-control diagram for the routine "move hard threshold down" called in block 1404 of FIG. 14.

FIG. 15 shows a flow-control diagram for the routine "move hard threshold down" called in block 1404 of FIG. 14. In block 1501, feedback statistics associated with related alerts are collected as described above with reference to FIG. 7. In block 1502, an average feedback count is calculated according to Equation (19). In block 1503, the hard threshold is decreased as described above with reference to Equation (20). In decision block 1504, when additional alerts are identified as described above with reference to FIG. 8, control flows to block 1505. Otherwise, control flows back to block 1503. In block 1505, a lower bound $V(B_i)$ for the modal subinterval of the weighted statistics histogram is identified. In block 1506, estimated feedback statistics for new alerts are added to the set of feedback statistics as described above with reference to FIG. 9 and Equation (21). In block 1507, the average of weighed statistics $m_{al}(k_{max})$ is calculated according to Equation (23). In decision block 1508, when the condition represented by Equation (17) is satisfied, control flows to decision block 1509. Otherwise, control flows to block 1510. In decision block 1509, when the noise degree is a maximum is close to the noise tolerance N, control flow to block 1510. Otherwise control flows to decision block 1511. In block 1510, an adjusted hard threshold is calculated according to Equation (24).

The control-flow diagram in FIG. 15 also includes blocks 1511-1515 that may be used to further decrease the hard threshold. In block 1511, when the condition given by Equation (25) is satisfied, control flows to block 1512. Otherwise, control flows to block 1510. The lesser interval next to the modal interval is identified in block 1512 and the lower bound of the lesser interval is identified in block 1513, as described above with reference to FIG. 10. In block 1514, the confidence $C(B_{al})$ is calculated according to Equation (27). In decision block 1515, when the confidence $C(B_{al})$ equals zero, control flows to block 1503. Otherwise, control flows to block 1506.

Figure 16:
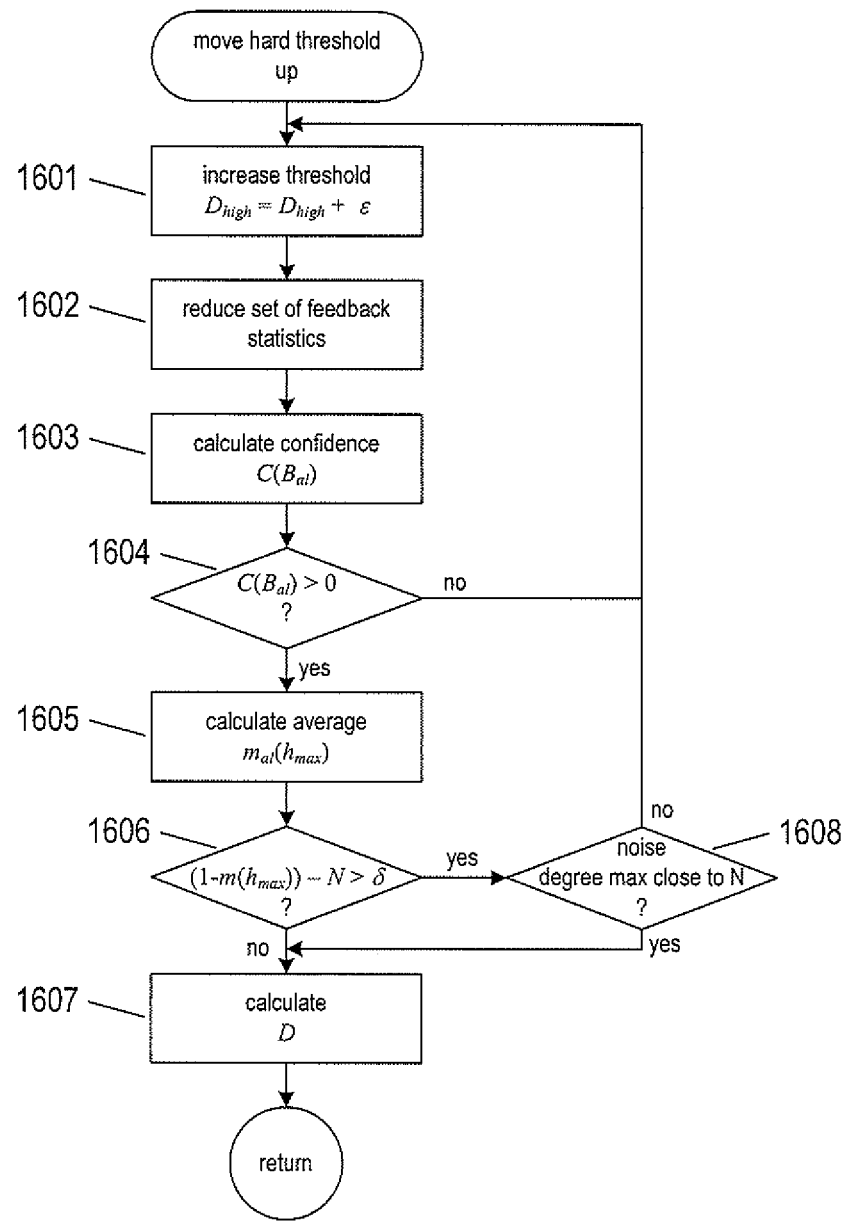
FIG. 16 shows a flow-control diagram for the routine "move hard threshold up" called in block 1406 of FIG. 14.

FIG. 16 shows a flow-control diagram for the routine "move hard threshold up" called in block 1406 of FIG. 14. In block 1601, the hard threshold is increased as described above with reference to Equation (30). In block 1602, the set of feedback statistics is reduced by removing feedback statistics associated with deleted alerts as described above with reference to Equation (31). In block 1603, the confidence $C(B_{al})$ is calculated according to Equation (33). In decision block 1604, when the alert confidence $C(B_{al})$ is greater than zero, control flows to block 1605 in which the average of weighted statistics for the indicativeness of the alerts is calculated. Otherwise, control flows back to block 1601 and the hard threshold is increased. In block 1606, when the condition represented by Equation (18) is satisfied, control flows to block 1608. Otherwise, control flows to block 1607 in which an adjusted hard threshold is calculated according to Equation (36). In decision block 1608, when the noise degree is a maximum is close the noise tolerance N, control flow to block 1607. Otherwise control flows to decision block 1601.

Figure 17:
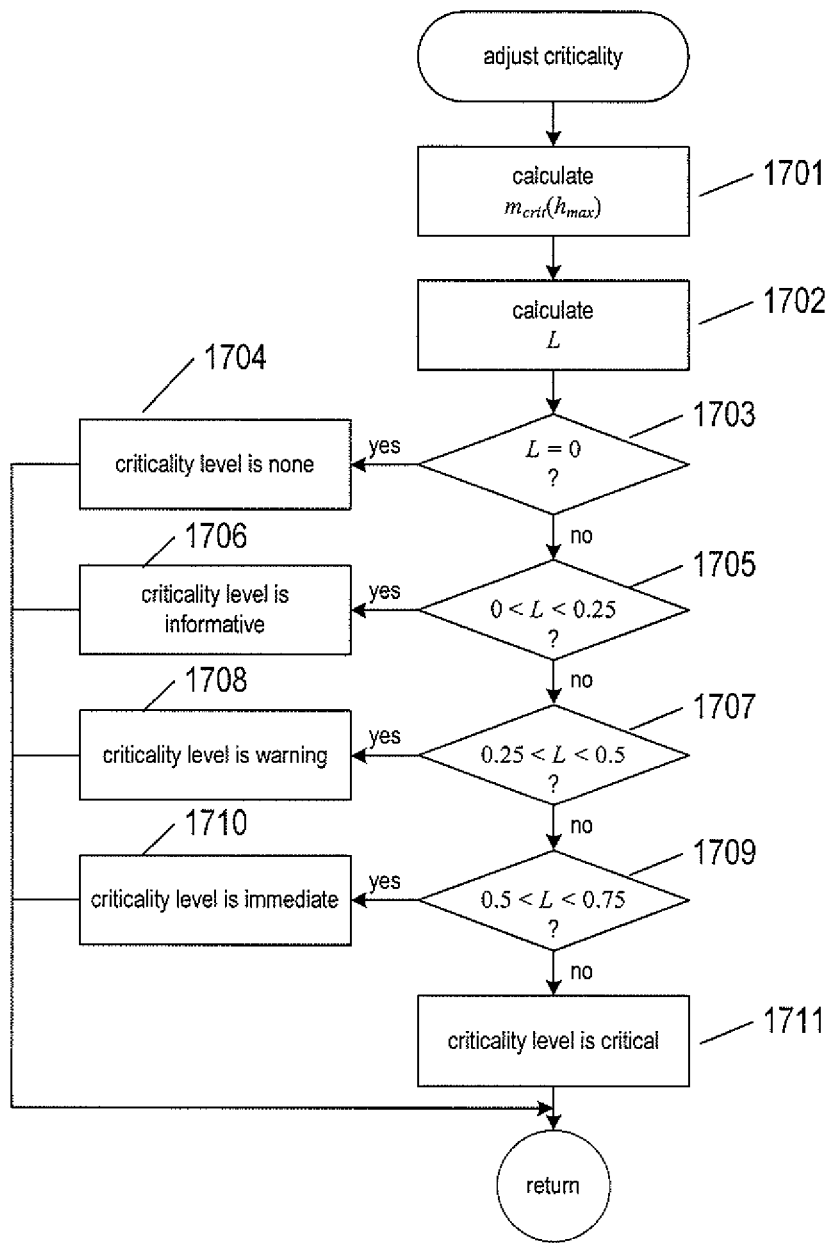
FIG. 17 shows a flow-control diagram for the routine "adjust criticality" called in block 1408 of FIG. 14.

FIG. 17 shows a flow-control diagram for the routine "adjust criticality" called in block 1408 of FIG. 14. In bock 1701, average of the weighted statistics for criticality confidence $C(B_{crit})$ is calculated. In block 1702, the criticality is calculated according to Equation (38). In decision block 1703, when L=0, the alert is changed to "non-critical" or "none" in block 1704. In decision block 1705, when 0<L≤0.25 the alert is changed to "informative" in block 1706. In decision block 1707, when 0.25<L≤0.5 the alert is changed to "warning" in block 1708. In decision block 1709, when 0.5<L≤0.75 the alert is changed to "immediate" in block 1710. Otherwise, and the alert is changed to "critical" in block 1711.

Although FIGS. 12-17 present flow-control diagrams of a method for adjusting an upper hard threshold D, methods and systems are not intended to be limited to adjusting upper hard thresholds. The methods described above may also be used to adjust a lower hard threshold d, such example lower hard threshold d in FIG. 2. The noise degree calculated as described above with reference to Equation (15) and compared with the user's selected noise tolerance $N_{lower}$, which can differ from the noise tolerance N for the upper threshold, to determine whether or not the alerts generated by violating the lower hard threshold d satisfy the user's tolerance for false positive alerts. When the difference between the noise degree and the user's noise tolerance $N_{lower}$ the condition given by Equation (16) with N equal to $N_{lower}$, the hard threshold d is left unchanged. However, when the difference satisfies the condition represented by Equation (18), with N equal to $N_{lower}$, the noise degree is too high, and the hard threshold is decreased according to $$d_{high}=d_{high}-\epsilon \qquad (43)$$

On the other hand, when the difference satisfies the condition represented by Equation (17), with N equal to $N_{lower}$, the noise degree is too low and the threshold is increased according to $$d_{low}=d_{low}+\epsilon \qquad (44)$$

Figure 18:
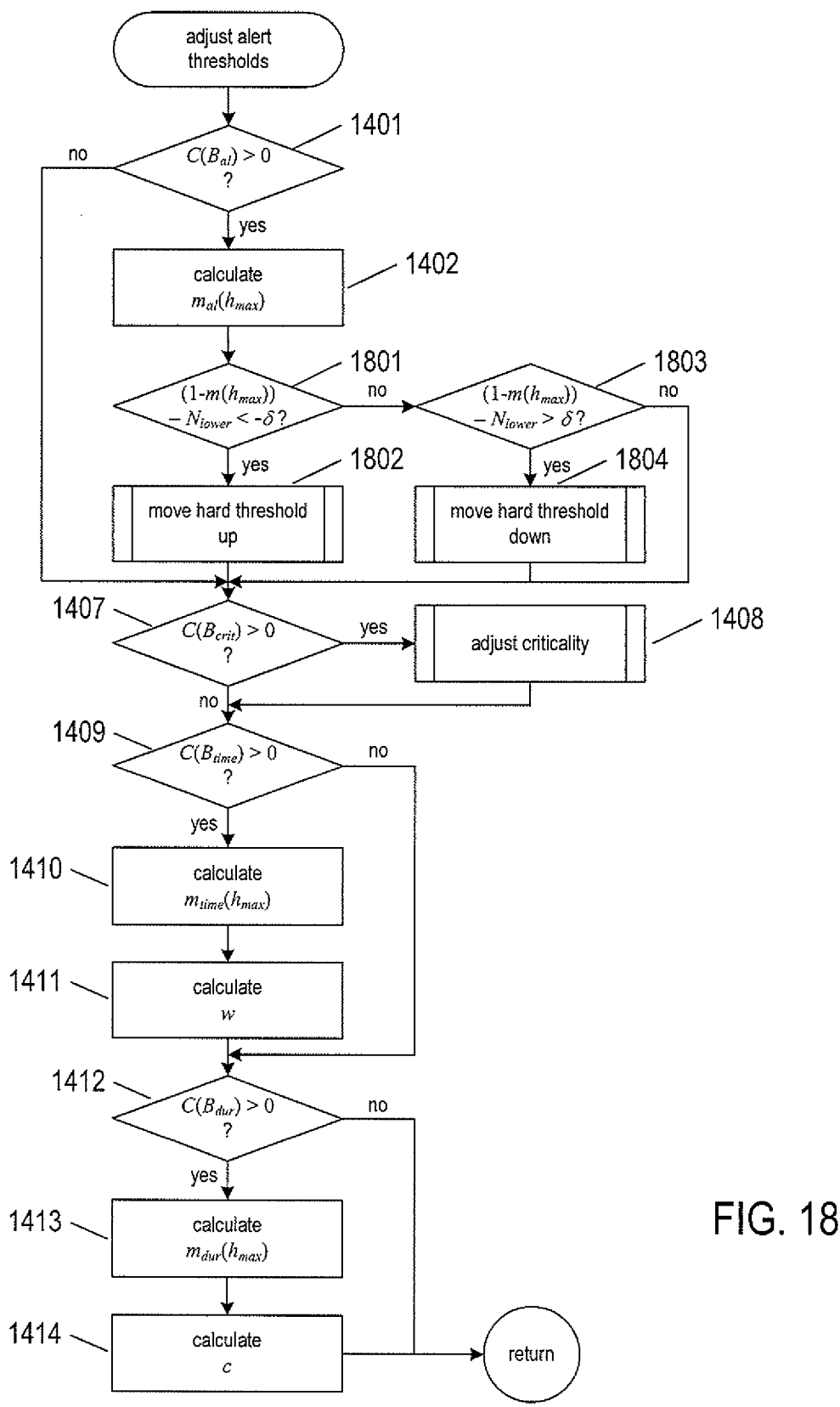
FIG. 18 shows a flow-control diagram of the routine "adjust alert thresholds" called in block 1211 of FIG. 12.
Figure 19:
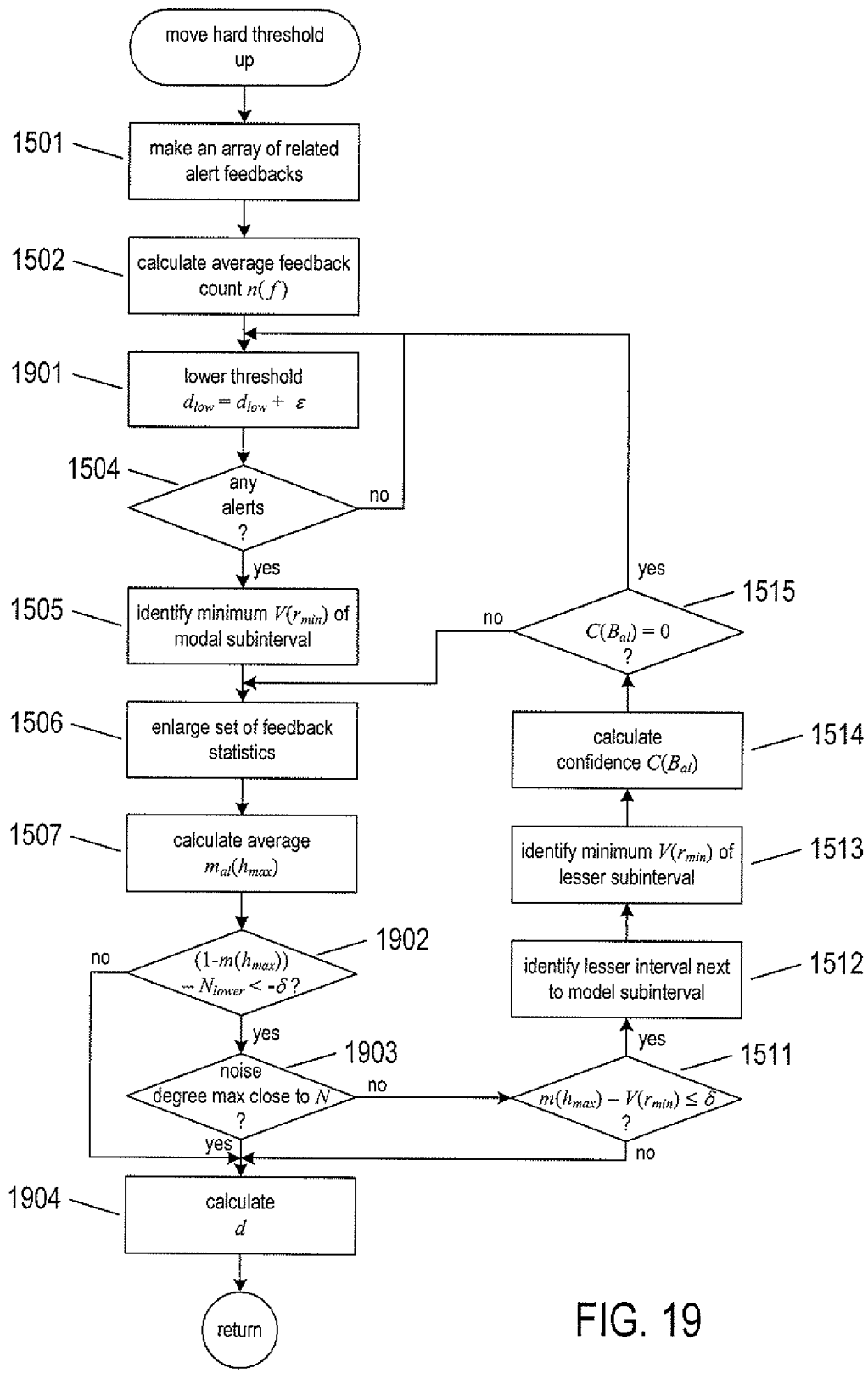
FIG. 19 shows a flow-control diagram for the routine "move hard threshold up" called in block 1801 of FIG. 18.
Figure 20:
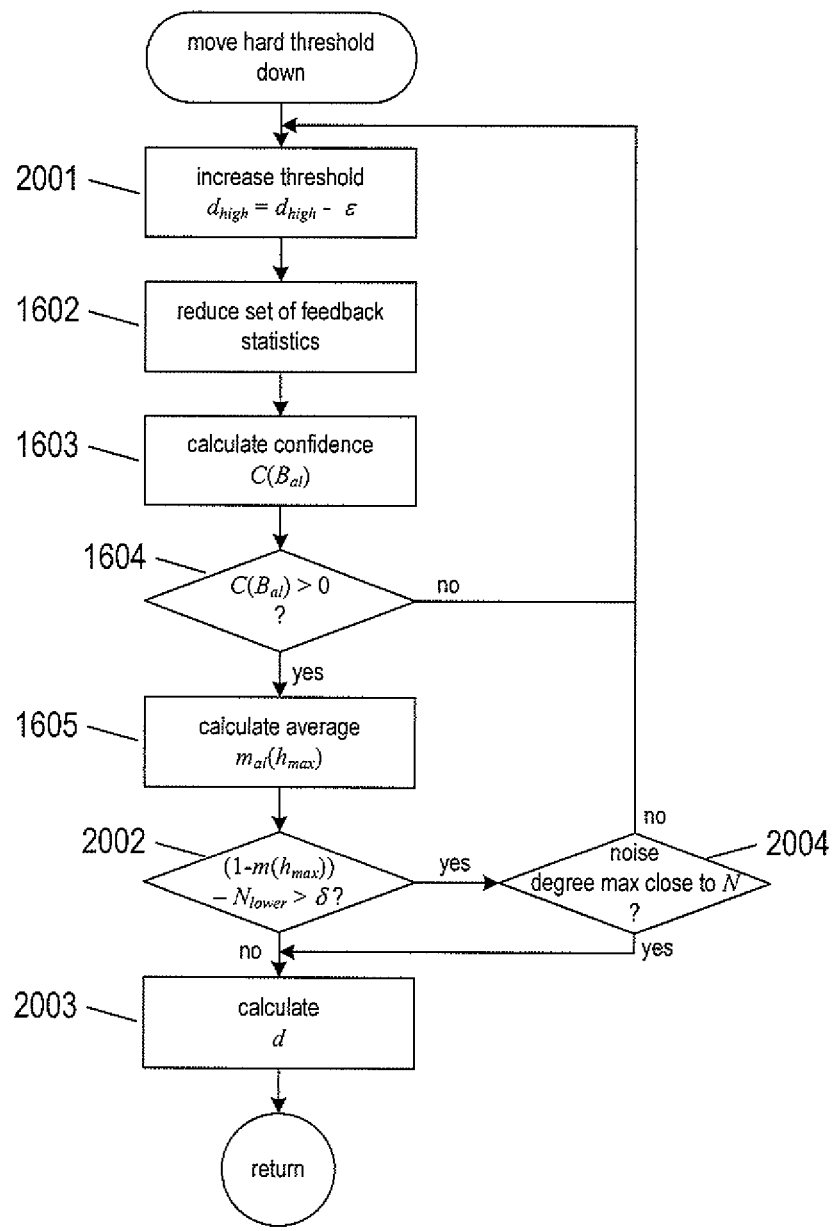
FIG. 20 shows a flow-control diagram for the routine "move hard threshold down" called in block 1802 of FIG. 18.

Although the control-flow diagrams in FIGS. 14-16 are directed to adjusting alert thresholds for an upper threshold D, these control-flow diagrams can be modified for adjusting alert thresholds for a lower hard threshold d. The flow-control diagram in FIG. 14 is replaced by flow-control diagram in FIG. 18; the flow-control diagram in FIG. 15 is replaced by flow-control diagram in FIG. 19; and the flow-control diagram in FIG. 16 is replaced by flow-control diagram in FIG. 20. Note that in decision blocks 1801 and 1803 of FIG. 18, decision blocks 1902 and 1903 of FIG. 19, and decision blocks 2002 and 2004 of FIG. 20, the noise tolerance N is replaced by the noise tolerance $N_{lower}$. In block 1802 of FIG. 18, a routine "move threshold up" is called and implemented as represented in FIG. 19, and in block 1804 of FIG. 18, a routine "move threshold down" is called an implemented as represented in FIG. 20. In block 1901 of FIG. 19, the lower threshold is adjusted according to Equation (44) and an adjusted threshold is calculated in block 1904 according to $$d=(1-C(B_{al}))d+C(B_{al})d_{low} \qquad (45)$$

In block 2001 of FIG. 20, the lower threshold is adjusted according to Equation (43) and an adjusted threshold is calculated in block 2003 according to $$d=(1-C(B_{al}))d+C(B_{al})d_{high} \qquad (46)$$

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computing environment, the method comprising:
   generating alerts when a portion of time-series data generated by a data-generating entity is greater than an upper hard threshold or less than a lower hard threshold;
   collecting user feedback for a number of the alerts;
   generating a set of user feedback statistics based on the user feedback;
   calculating an alert confidence based on the feedback statistics; and
   calculating an adjusted hard threshold based on the hard threshold when the alert confidence is greater than zero.

2. The method of claim 1, wherein collecting user feedback further comprises one or presenting a user with one or more survey questions for each of the number of alerts and monitor the user's activities following each of the number of alerts.

3. The method of claim 1, wherein generating the set of user feedback statistics further comprises assigning a numerical value to each answer a user gives to one or more survey questions regarding an alert, each numerical value is a user feedback statistic in the set of feedback statistics.

4. The method of claim 1, wherein calculating the alert confidence further comprises
   calculating weighted statistics for the set of feedback statistics;
   forming a histogram of the weighted statistics distributed over a number of subintervals;
   calculating normalized frequencies of the weighted statistics based on the distribution of the weighted statistics;
   calculating an entropy value of the weighted statistics; and
   calculating a confidence value based on entropy value of the weighted statistics.

5. The method of claim 1, wherein calculating the adjusted hard threshold further comprises calculating an average of weighted statistics based on the feedback statistics when the alert confidence is greater than zero;
calculating a noise degree from the average of the weighted statistics;
when the hard threshold is an upper hard threshold,
  decreasing the hard threshold, when a difference between the noise degree and a user-defined noise tolerance is negative valued and outside a tolerance interval;
  increasing the hard threshold, when the difference between the noise degree and the user-defined noise tolerance is positive valued and outside the tolerance interval; and
calculating the adjusted hard threshold as a function of the average of the weighted statistics, the alert confidence, and one of the increased and decreased hard threshold.

6. The method of claim 1, wherein calculating the adjusted hard threshold further comprises
calculating an average of weighted statistics based on the feedback statistics when the alert confidence is greater than zero;
calculating a noise degree from the average of the weighted statistics;
when the hard threshold is a lower hard threshold,
  increasing the hard threshold, when a difference between the noise degree and a user-defined noise tolerance is negative valued and outside a tolerance interval;
  decreasing the hard threshold, when the difference between the noise degree and the user-defined noise tolerance is positive valued and outside the tolerance interval; and
calculating the adjusted hard threshold as a function of the average of the weighted statistics, the alert confidence, and one of the increased and decreased hard threshold.

7. The method of claim 1 further comprises
generating sets of user feedback statistics regarding criticality, timeliness, and duration of the number of alerts based on the user feedback;
calculating a criticality confidence, timeliness confidence, and duration confidence based on corresponding feedback statistics;
calculating adjusted criticality when the criticality confidence is greater than zero
calculating adjusted timeliness when the timeliness confidence is greater than zero; and
calculating adjusted duration when the duration confidence is greater than zero.

8. A system for adjusting a hard threshold comprising:
one or more processors;
one or more data-storage devices; and
a routine stored in the one or more data-storage devices and that when executed using the one or more processors, the routine controls the system to carry out
  generating alerts when a portion of time-series data generated by a data-generating entity is greater than an upper hard threshold or less than a lower hard threshold;
  collecting user feedback for a number of the alerts;
  generating a set of user feedback statistics based on the user feedback;
  calculating an alert confidence based on the feedback statistics; and
  calculating an adjusted hard threshold based on the hard threshold when the alert confidence is greater than zero.

9. The system of claim 8, wherein collecting user feedback further comprises one or presenting a user with one or more survey questions for each of the number of alerts and monitor the user's activities following each of the number of alerts.

10. The system of claim 8, wherein generating the set of user feedback statistics further comprises assigning a numerical value to each answer a user gives to one or more survey questions regarding an alert, each numerical value is a user feedback statistic in the set of feedback statistics.

11. The system of claim 8, wherein calculating the alert confidence further comprises
calculating weighted statistics for the set of feedback statistics;
forming a histogram of the weighted statistics distributed over a number of subintervals;
calculating normalized frequencies of the weighted statistics based on the distribution of the weighted statistics;
calculating an entropy value of the weighted statistics; and
calculating a confidence value based on entropy value of the weighted statistics.

12. The system of claim 8, wherein calculating the adjusted hard threshold further comprises
calculating an average of weighted statistics based on the feedback statistics when the alert confidence is greater than zero;
calculating a noise degree from the average of the weighted statistics;
when the hard threshold is an upper hard threshold,
  decreasing the hard threshold, when a difference between the noise degree and a user-defined noise tolerance is negative valued and outside a tolerance interval, decreasing the hard threshold;
  increasing the hard threshold, when the difference between the noise degree and the user-defined noise tolerance is positive valued and outside the tolerance interval, increasing the hard threshold; and
calculating the adjusted hard threshold as a function of the average of the weighted statistics, the alert confidence, and one of the increased and decreased hard threshold.

13. The system of claim 8, wherein calculating the adjusted hard threshold further comprises
calculating an average of weighted statistics based on the feedback statistics when the alert confidence is greater than zero;
calculating a noise degree from the average of the weighted statistics;
when the hard threshold is a lower hard threshold,
  increasing the hard threshold, when a difference between the noise degree and a user-defined noise tolerance is negative valued and outside a tolerance interval, decreasing the hard threshold;
  decreasing the hard threshold, when the difference between the noise degree and the user-defined noise tolerance is positive valued and outside the tolerance interval, increasing the hard threshold; and
calculating the adjusted hard threshold as a function of the average of the weighted statistics, the alert confidence, and one of the increased and decreased hard threshold.

14. The system of claim 8 further comprises
generating sets of user feedback statistics regarding criticality, timeliness, and duration of the number of alerts based on the user feedback;

calculating a criticality confidence, timeliness confidence, and duration confidence based on corresponding feedback statistics;
calculating adjusted criticality when the criticality confidence is greater than zero
calculating adjusted timeliness when the timeliness confidence is greater than zero; and
calculating adjusted duration when the duration confidence is greater than zero.

15. A non-transitory computer-readable medium encoded with machine-readable instructions that implement a method carried out by one or more processors of a computer system to perform the operations of
generating alerts when a portion of time-series data generated by a data-generating entity is greater than an upper hard threshold or less than a lower hard threshold;
collecting user feedback for a number of the alerts;
generating a set of user feedback statistics based on the user feedback;
calculating an alert confidence based on the feedback statistics; and
calculating an adjusted hard threshold based on the hard threshold when the alert confidence is greater than zero.

16. The medium of claim 15, wherein collecting user feedback further comprises one or presenting a user with one or more survey questions for each of the number of alerts and monitor the user's activities following each of the number of alerts.

17. The medium of claim 15, wherein generating the set of user feedback statistics further comprises assigning a numerical value to each answer a user gives to one or more survey questions regarding an alert, each numerical value is a user feedback statistic in the set of feedback statistics.

18. The medium of claim 15, wherein calculating the alert confidence further comprises
calculating weighted statistics for the set of feedback statistics;
forming a histogram of the weighted statistics distributed over a number of subintervals;
calculating normalized frequencies of the weighted statistics based on the distribution of the weighted statistics;
calculating an entropy value of the weighted statistics; and
calculating a confidence value based on entropy value of the weighted statistics.

19. The medium of claim 15, wherein calculating the adjusted hard threshold further comprises
calculating an average of weighted statistics based on the feedback statistics when the alert confidence is greater than zero;
calculating a noise degree from the average of the weighted statistics;
when the hard threshold is an upper hard threshold,
decreasing the hard threshold, when a difference between the noise degree and a user-defined noise tolerance is negative valued and outside a tolerance interval, decreasing the hard threshold;
increasing the hard threshold, when the difference between the noise degree and the user-defined noise tolerance is positive valued and outside the tolerance interval, increasing the hard threshold; and
calculating the adjusted hard threshold as a function of the average of the weighted statistics, the alert confidence, and one of the increased and decreased hard threshold.

20. The medium of claim 15, wherein calculating the adjusted hard threshold further comprises
calculating an average of weighted statistics based on the feedback statistics when the alert confidence is greater than zero;
calculating a noise degree from the average of the weighted statistics;
when the hard threshold is a lower hard threshold,
increasing the hard threshold, when a difference between the noise degree and a user-defined noise tolerance is negative valued and outside a tolerance interval, decreasing the hard threshold;
decreasing the hard threshold, when the difference between the noise degree and the user-defined noise tolerance is positive valued and outside the tolerance interval, increasing the hard threshold; and
calculating the adjusted hard threshold as a function of the average of the weighted statistics, the alert confidence, and one of the increased and decreased hard threshold.

21. The medium of claim 15 further comprises
generating sets of user feedback statistics regarding criticality, timeliness, and duration of the number of alerts based on the user feedback;
calculating a criticality confidence, timeliness confidence, and duration confidence based on corresponding feedback statistics;
calculating adjusted criticality when the criticality confidence is greater than zero
calculating adjusted timeliness when the timeliness confidence is greater than zero; and
calculating adjusted duration when the duration confidence is greater than zero.

* * * * *